(12) United States Patent
Laurenti et al.

(10) Patent No.: US 6,760,837 B1
(45) Date of Patent: Jul. 6, 2004

(54) BIT FIELD PROCESSOR

(75) Inventors: Gilbert Laurenti, Saint Paul de Vence (FR); Jean-Pierre Giacalone, Vence (FR); Emmanuel Ego, Antibes (FR); Marc Couvrat, Saint Laurent du Var (FR)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/410,864

(22) Filed: Oct. 1, 1999

(30) Foreign Application Priority Data

Oct. 6, 1998 (EP) .......................................... TI-28433EU
Mar. 8, 1999 (EP) .......................................... TI-27677EU

(51) Int. Cl.[7] .............................................. G06F 7/00
(52) U.S. Cl. ....................................................... 712/300
(58) Field of Search ........................................ 712/300

(56) References Cited

U.S. PATENT DOCUMENTS

| | | | |
|---|---|---|---|
| 4,336,600 A | | 6/1982 | Houdard et al. |
| 5,075,882 A | * | 12/1991 | Sakai et al. ................. 708/205 |
| 5,835,793 A | | 11/1998 | Li et al. |
| 6,052,522 A | * | 4/2000 | Mattela et al. ................ 703/13 |

FOREIGN PATENT DOCUMENTS

EP   0 661 623 A   7/1995

OTHER PUBLICATIONS

T.L. Jeremiah, et al.; *ALU With Integral Leading Zero Counter*, IBM Technical Disc. Bulletin, IBM Corp., New York, US, vol. 23, No. 1, Jun. 1, 1980, pp. 25–26.
J. Phillips, et al.; *High–Performance 3–1 Interlock Collapsing ALU's*, IEEE Transactions on Computers, IEEE Inc., New York, US, vol. 43, No. 1, Mar. 1, 1994, pp. 257–268.
J. Thornton, *Design of a Computer, the Control Data 6600*, 1970, Scott, Foreseman and Company, pp. 105–106.

\* cited by examiner

*Primary Examiner*—William M. Treat
(74) *Attorney, Agent, or Firm*—Robert D. Marshall, Jr.; W. James Brady, III; Frederick J. Telecky, Jr.

(57) ABSTRACT

An execution unit for a processing engine comprising first head part circuitry for deriving an intermediate signal from an input signal. The execution unit also comprises further circuitry which receives the intermediate signal and operates on it to produce a final signal. The further circuitry is typically configured to perform one or more signal processing functions in combination with the first circuitry, and generally comprises separate circuitry for each function. The intermediate signal is configured to be usable by each of the separate circuitry.

8 Claims, 17 Drawing Sheets

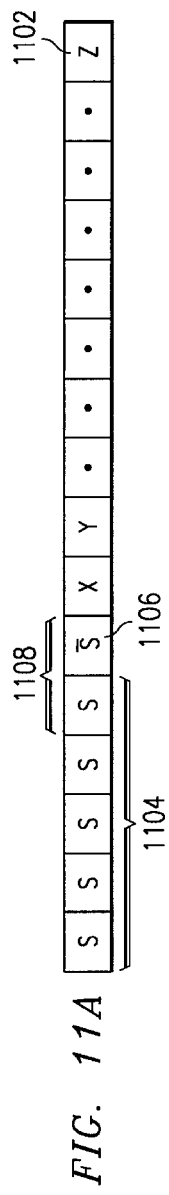
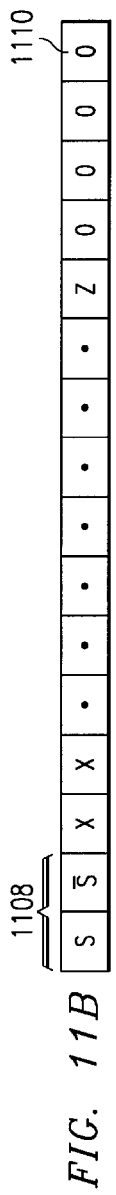
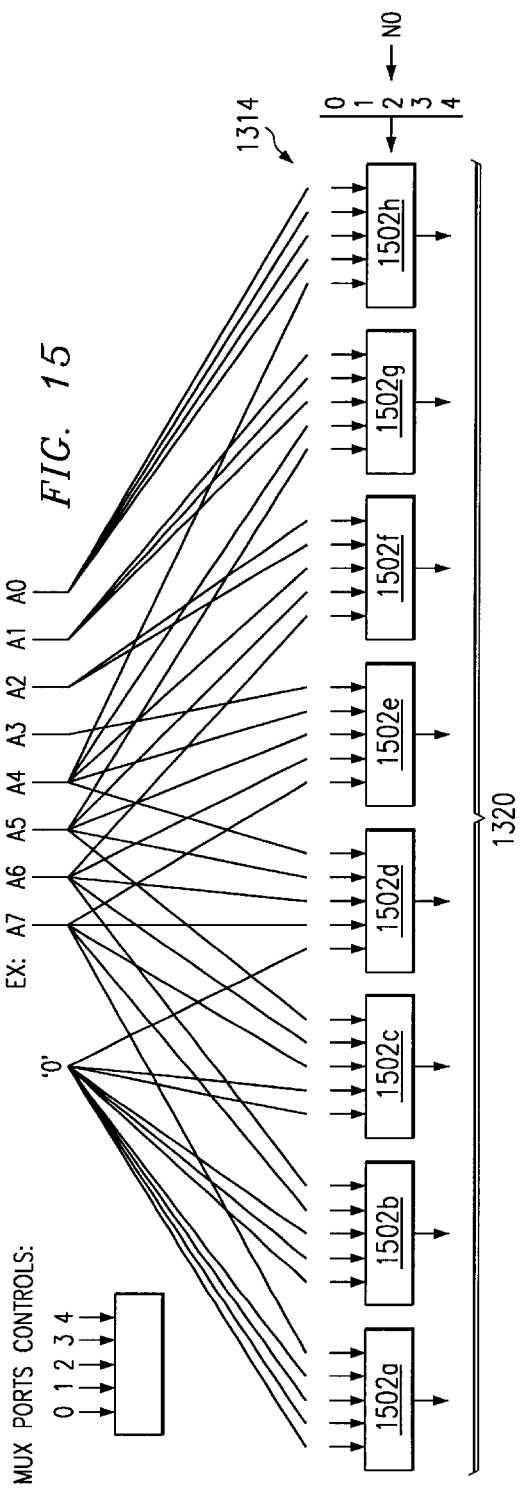

BIT_FIELD EXPAND: ENCODER TRUTH TABLE

| M3 | M2 | M1 | M0 | S3 | S2 | S1 | S0 |
|---|---|---|---|---|---|---|---|
| 0 | 0 | 0 | 0 | 0 | 0 | 0 | 0 |
| 0 | 0 | 0 | 1 | 0 | 0 | 0 | A0 |
| 0 | 0 | 1 | 1 | 0 | 0 | A1 | A0 |
| 0 | 0 | 1 | 0 | 0 | 0 | A0 | 0 |
| 0 | 1 | 1 | 0 | 0 | A1 | A0 | 0 |
| 0 | 1 | 1 | 1 | 0 | A2 | A1 | A0 |
| 0 | 1 | 0 | 1 | 0 | A1 | 0 | A0 |
| 0 | 1 | 0 | 0 | 0 | A0 | 0 | 0 |
| 1 | 1 | 0 | 0 | A1 | A0 | 0 | 0 |
| 1 | 1 | 0 | 1 | A2 | A1 | 0 | A0 |
| 1 | 1 | 1 | 1 | A3 | A2 | A1 | A0 |
| 1 | 1 | 1 | 0 | A2 | A1 | A0 | 0 |
| 1 | 0 | 1 | 0 | A1 | 0 | A0 | 0 |
| 1 | 0 | 1 | 1 | A2 | 0 | A1 | A0 |
| 1 | 0 | 0 | 1 | A1 | 0 | 0 | A0 |
| 1 | 0 | 0 | 0 | A0 | 0 | 0 | 0 |

FIG. 17

BIT_EXPONENT: ENCODER TRUTH TABLE

| A3 | A2 | A1 | A0 | S2 | S1 | S0 |
|---|---|---|---|---|---|---|
| 0 | 0 | 0 | 0 | 1 | 0 | 1 |
| 0 | 0 | 0 | 1 | 1 | 0 | 0 |
| 0 | 0 | 1 | 1 | 1 | 0 | 0 |
| 0 | 0 | 1 | 0 | 1 | 0 | 1 |
| 0 | 1 | 1 | 0 | 1 | 1 | 1 |
| 0 | 1 | 1 | 1 | 0 | 0 | 0 |
| 0 | 1 | 0 | 1 | 1 | 0 | 1 |
| 0 | 1 | 0 | 0 | 1 | 0 | 1 |
| 1 | 1 | 0 | 0 | 1 | 0 | 1 |
| 1 | 1 | 0 | 1 | 1 | 0 | 1 |
| 1 | 1 | 1 | 1 | 0 | 0 | 0 |
| 1 | 1 | 1 | 0 | 1 | 1 | 0 |
| 1 | 0 | 1 | 0 | 1 | 0 | 0 |
| 1 | 0 | 1 | 1 | 1 | 0 | 0 |
| 1 | 0 | 0 | 1 | 1 | 0 | 0 |
| 1 | 0 | 0 | 0 | 1 | 0 | 0 |

FIG. 19

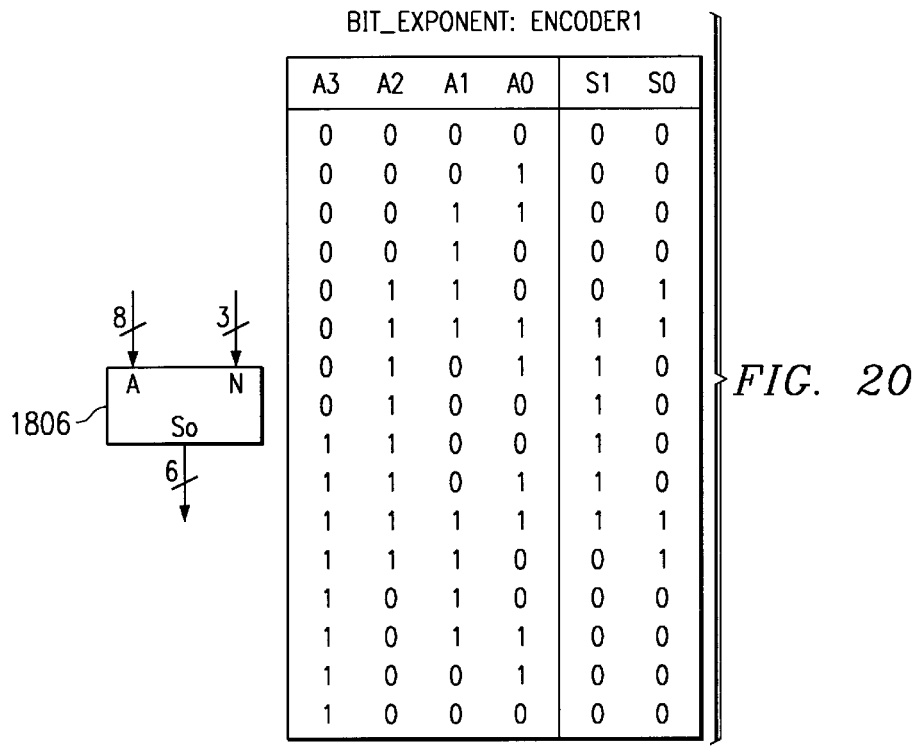
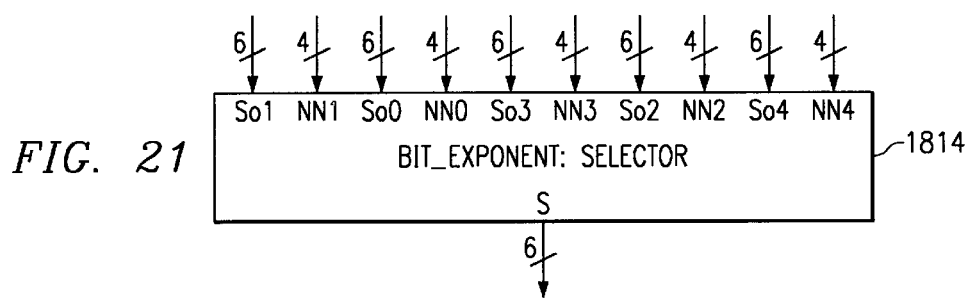
FIG. 20
FIG. 21
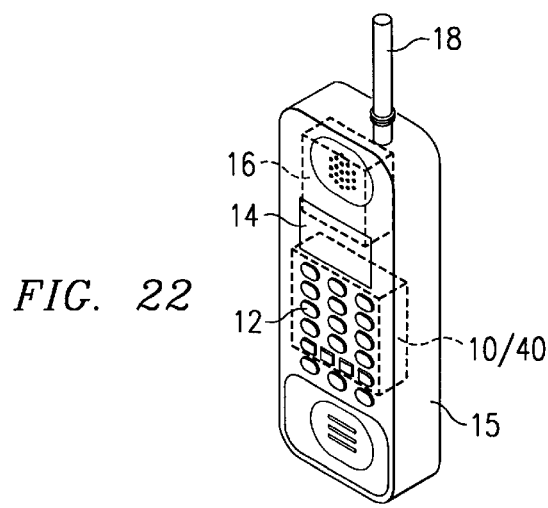
FIG. 22

BIT FIELD PROCESSOR

This application claims priority to S.N. 99400557.7, filed in Europe Patent Office on Mar. 8, 1999 and S.N. 98402455.4, filed in Europe Patent Office on Oct. 6, 1998.

FIELD OF THE INVENTION

The present invention relates to processing engines configurable to manipulate bit fields, and in particular but not exclusively, to digital signal processors.

BACKGROUND OF THE INVENTION

Many different types of processing engine are known, of which microprocessors are but one example. For example, Digital Signal Processors (DSPs) are widely used, in particular for specific applications. DSPs are typically configured to optimise the performance of the applications concerned and to achieve this they employ more specialised execution units and instruction sets.

A particular application of DSPs is in telecommunications equipment. Modern telecommunications systems require a high level of processing of the data transmitted over the system, for example for channel coding and de-coding, interleaving and de-interleaving or error checking or correction techniques such as cyclic redundancy checking. Such processing operates on bit fields within the data, which are expanded into or extracted from data packets transmitted over the telecommunication system and provide for data to be split and reconstructed in a manner suitable for improving or enhancing the robustness or integrity of the transmission channel. Another application is in pure signal processing, where it is frequently necessary to normalize a table of numbers representing a sampled signal, in order to maintain a good level of accuracy throughout the signal processing task. Such normalization may occur during floating point operations. Typically a normalized number, such as the mantissa, has its sign bit in the most significant bit (msb) position and the complement of the sign bit on the next lower bit position (in the form of S, not (S), X, Y, . . . Z). A mantissa which is not normalized has more than one sign bit from its most to its least significant bit (in the form of S,S, . . . , S, not (S), X, Y, . . . Z). Normalization typically comprises finding the bit location of the "S, not (S)" sequence within the number (typically called exponent computation) and shifting the "S, not (S)" sequence to the most significant bits. Often, the msb for the mantissa value is not the same as the msb for the data word comprising the mantissa. For example, for a 40 bit data word the msb for the mantissa value, or normalized sign position bit, may be bit 31. The remaining more significant bits serve as overflow bits during floating point arithmetic. Thus, even for a normalized mantissa there could be a sequence of sign bits from the msb of the data word to the msb of the mantissa.

It is known to implement bit processing techniques either in software or hardware. Software implementations generally have a slow performance and a large code size. Hardware implementations are generally less flexible, and are physically located in different processor units, for example one in a fixed-point module and the other in a floating-point module. Additionally, bit field extract or expand functions have been implemented in a limited fashion that requires the bits to be extracted to be in a contiguous area of the data source, that is data memory. This is due to the fact that known bit field extract or expand functions utilize a shifter combined with mask logic. Additionally, the shifter is limited to performing only the bit field extract or expand functions, and is unable to be used in parallel for other tasks.

The present invention is directed to improving the performance of processing engines such as, for example but not exclusively, digital signal processors.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided an execution unit for a processing machine comprising first circuitry adapted to derive an intermediate signal input thereto. This is also provided further circuitry for receiving an intermediate signal and operating on it and/or receiving and operating on a signal associated with the input signal, in accordance with the intermediate signal in order to provide a further signal derived from the input signal and/or associated signal.

In a first embodiment in accordance with the invention, the further circuitry comprises tail-part circuitry operable with the first circuitry to form a composite bit counter, and to process intermediate signal in order to provide a bit count of the input signal.

In accordance with a second embodiment of the invention, the further circuitry comprises circuitry operable with the first circuitry for forming composite bit extract circuitry, and for utilizing the intermediate signal to provide a bit sequence extracted from the associated signal in accordance with the input signal.

In accordance with a third embodiment of the invention, the further circuitry comprises circuitry operable with said first circuitry for forming a composite bit expand circuitry. The intermediate signal is utilized to provide a bit sequence expanded from said associated signal in accordance with said input signal.

In accordance with a fourth embodiment of the invention, the further circuitry comprises tail-part circuitry operable with the first circuitry for forming composite exponent counting circuitry, utilizing said intermediate signal to provide a shift value for normalizing the input signal.

The foregoing embodiments in accordance with the invention may be provided together in any combination of two or more embodiments. An advantage of such a combination is that there is provided a common architecture for bit processing functionality typically required in signal processing applications. In particular, bit count circuitry, bit field extract and bit field expand circuitry and exponent counting circuitry may be combined into a common architecture sharing a first or head part circuitry which produces signals utilizable by separate specific circuitry for performing separate signal processing functions. Such an architecture advantageously reduces the surface area required by the signal processing functions on integrated circuits, thereby reducing the cost of such integrated circuits, or providing opportunities for further circuits and functionality on that integrated circuit.

Additionally, the common architecture supports bit field extract and expand functions for non-contiguous bits, such as bits from non-contiguous locations in an accumulator register, for example. Additionally, the common architecture provides single cycle operation within a processor timing sequence.

The further circuitry typically comprises separate circuits for performing respective signal processing operations on the associated signal in accordance with the intermediate signal, and/or for performing respective operations on the intermediate signal to derive respective signal processor results from the input signal. Each of said separate circuits can be directed to one or more of the preferred embodiments such as bit expand or extract, bit count or exponent count circuitry.

Preferably the first circuitry is adapted to derive the intermediate signal such that it is optimally configured for utilization by the further circuitry. More preferably the first circuitry is adapted to operate on segments of the input signal, said segments being sized to provide the optimally configured intermediate signal. Such optimal configuration may be directed towards reducing the number of processing elements or gates required for implementing the first and further circuitry, thereby reducing the surface area required by the common architecture.

The first circuitry and separate ones of the further circuitry provide respective composite signal processing circuitry for respective signal operations, and such respective composite signal processing circuitry may be formed non-concurrently with other of said respective composite signal processing circuitry. Thus, the common architecture may be configured to operate in parallel thereby providing enhanced speed of operation, or one composite signal processing circuit at a time.

Typically, the first circuitry is operable to determine the number of occurrences of a date attribute in respective segments of the input signal, wherein the input signal generally comprises a sequence binary digits (bits). Suitably, the respective segments comprise groups of bits. The data attribute for an input signal comprising a sequence of binary digits is one of "set" or "not set".

It is advantageous to provide first circuitry performing "bit" counting, since signal processing functions generally require knowledge of a number of bits in an input signal or segments of input signals in order to perform the function. Thus, such bit counting circuitry provides a suitable head part or first circuitry for a common architecture for signal processing functions.

Generally a first stage of a first circuitry comprises digital counters respectively associated with respective segments of the input signal, and providing an output which is representative of the number of occurrences of a data attribute in an associated segment.

The respective segments generally comprise groups of four bits, and the digital counters comprise four inputs. In a preferred embodiment, the digital counters comprise "four into two" counters.

A suitable configuration for the first stage is that of the first stage of a reduction tree for obtaining the bit count for the input signal, and a second stage of the first circuitry is suitably configured as a second stage of a reduction tree for obtaining a bit count for the input signal. In a preferred embodiment, the second stage provides the intermediate signal.

Generally, the second stage outputs a signal which is representative for a bit count for two adjacent segments of the input signal.

For the first embodiment in accordance with the invention, the tail part circuitry is configurable as a reduction tree for receiving the intermediate signal from the second stage and for providing a bit count of the input signal. Advantageously, the reduction tree is a "Wallace-like" reduction tree which is a well known configuration. It is preferable, that the intermediate signal comprises a classically encoded bit count for the adjacent respective segments.

In accordance with the second embodiment of the invention, the further circuitry comprises means for slicing the associated signal and input signal into corresponding groups and shifting a bit positioned in an associated signal group to a position determined by a corresponding input signal group. The further circuitry further comprises means for receiving a signal corresponding to a signal from the slicing means comprising the shifted bit, and operating on that signal in accordance with controlled signals derived from intermediate signal. The means for receiving the signal is adapted to operate on a signal in larger groups than the means for slicing, and to shift a bit positioned in that signal to a position determined by the control signals. Thus, the subsequent stages of the further circuitry operate on groups of bits corresponding to larger segments or groups of the input signal.

Preferably, the further circuitry comprises a further means for receiving, which means it is adapted to operate on a signal from the means for receiving in a yet larger group, and to shift a bit positioned in said signal from said means for receiving to a position determined by further controlled signals derived from the intermediate signal.

Advantageously, the slicing means comprises an encoder, and the means for receiving and further means for receiving comprise multiplexors. The input signal comprises a bit mask for identifying the bits to be extracted from the associated signal.

In the third embodiment of the invention, the further circuitry comprises means for distributing bits from the associated signal to bit locations in at least two bit groups determined by control signals derived from intermediate signals. The further circuitry also comprises means for distributing bits of the distributed bits to bit locations in smaller bit groups determined by further control signals derived from the intermediate signal. Finally, the further circuitry comprises a further means for distributing bits of a signal corresponding to distributed bits from the means for distributing to bit locations in yet smaller groups determined by controlled signals derived from the input signal or mask.

Suitably, the means for distributing bits from the associated signal and the means for distributing bits of the distributed bits comprised in multiplexors, and the further means for distributing comprises an encoder.

In the fourth embodiment in accordance with the invention, the further circuitry comprises tail-part circuitry comprising respective processing means for receiving respective segments of the input signal and controllable by signals derivable from respective parts of the intermediate signal to provide the shift value for normalizing the input signal.

Embodiments in accordance with the invention help reduce the surface area necessary for providing circuitry for performing signal processing functions. Thus, further functionality may be incorporated on a processor, digital signal processor or integrated circuit incorporating embodiments of the invention. This makes embodiments of the invention particularly suitable for portable apparatus, such as wireless communication devices, in which maximum functionality in minimum surface area is desirable.

A particularly advantageous utilization of embodiments in accordance with the invention is in a wireless communications device comprising a user interface including a display, a keypad or key board for inputting data to the communication device, a transceiver and an antenna operable coupleable to the transceiver, and which further comprises an execution unit as described above, or a processor, a digital signal processor or integrated circuit comprising such an execution unit.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 11A is a schematic illustration of an un-normalized mantissa;

FIG. 11B is a schematic illustration of a normalized mantissa;

FIG. 15 is a schematic illustration of the operation of the first and second level selectors of FIG. 13;

FIG. 17 is a simplified diagram of an encoder of FIG. 13 and a truth table therefor;

FIG. 19 is a simplified diagram of a first encoder of FIG. 18 and a truth table therefor;

FIG. 20 is a simplified diagram of a second encoder of FIG. 18 and a truth table therefor;

FIG. 21 is a block diagram of the selector of FIG. 18; and

FIG. 22 is a schematic illustration of a radio apparatus suitable for incorporating an embodiment of the invention.

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

The basic architecture of an example of a processor according to the invention will now be described.

Figure 1:
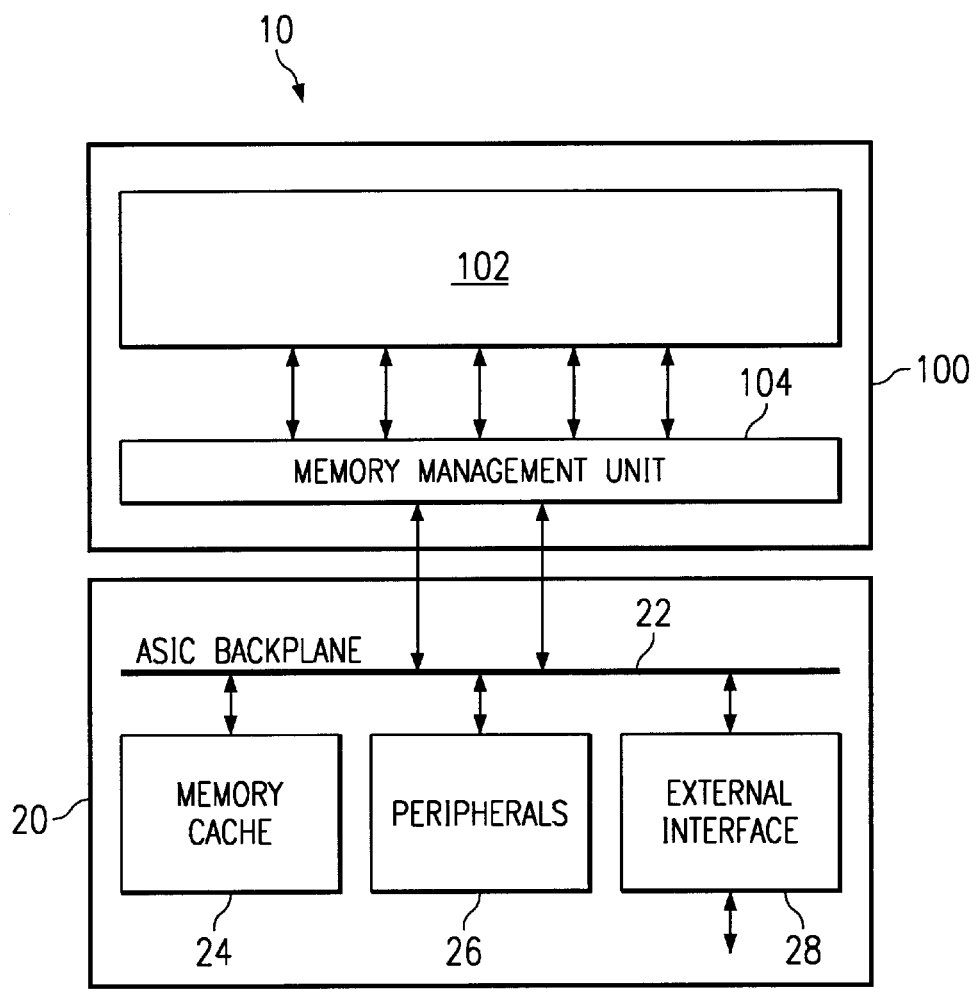
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 filed contemporaneously with this application, entitled IMPROVEMENTS IN OR RELATING TO MICROPROCESSORS, now U.S. Pat. No. 6,658,578, which is incorporated herein by reference.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine or a processor including the processing engine could be implemented in one or more integrated circuits.

Figure 2:
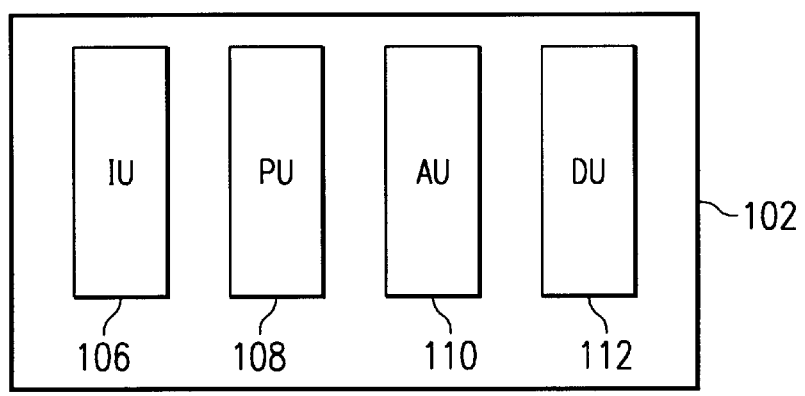
FIG. 2 is a schematic block diagram illustrating the four main elements of the core processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
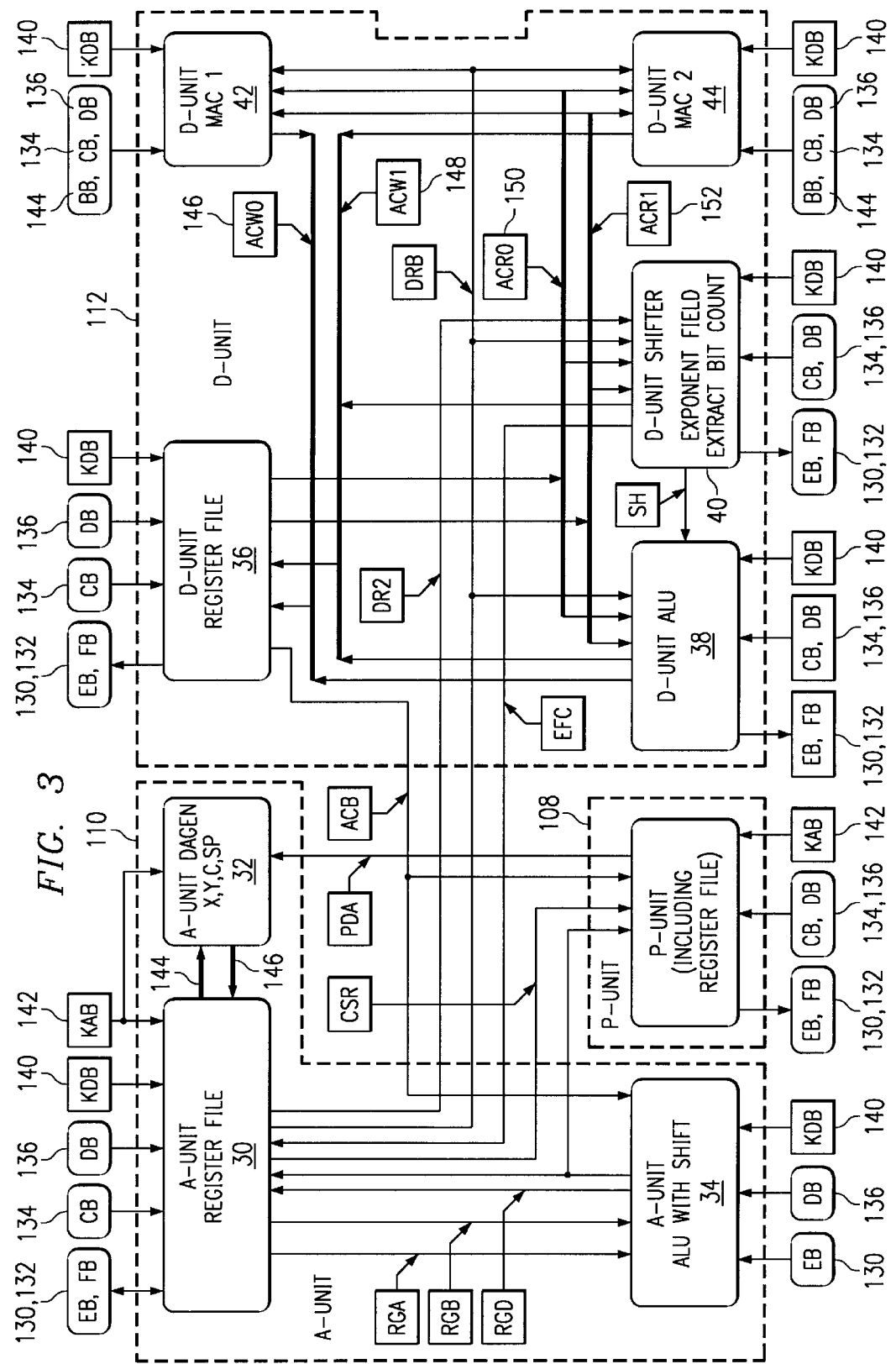
FIG. 3 is a schematic block diagram illustrating a P Unit, A Unit and D Unit of the core processor of FIG. 2.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and a address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, an instruction data constant bus (KDB) 140 and an address constant bus (KAB) 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and Data Read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
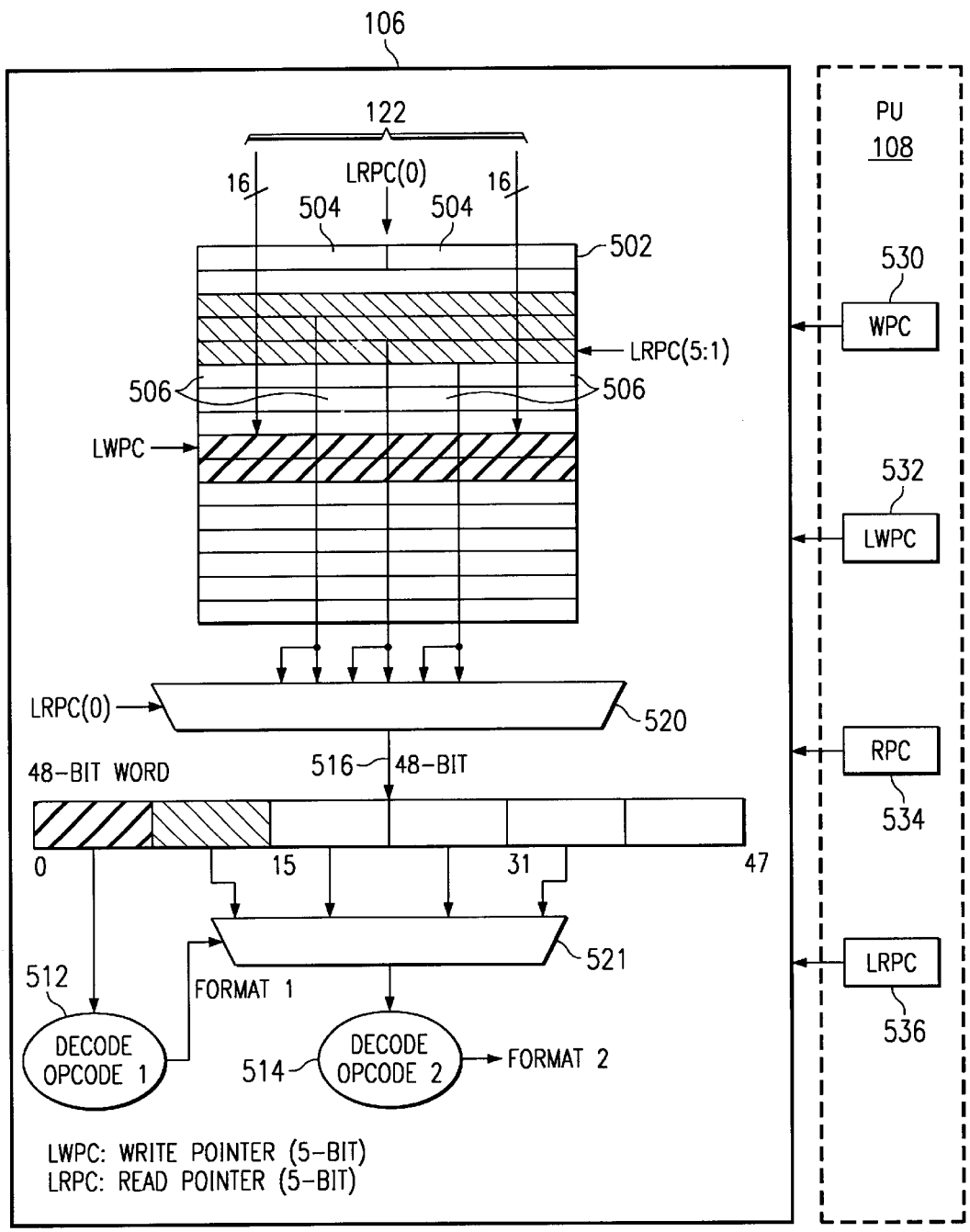
FIG. 4 is a schematic illustration of the operation of an I Unit of the core processor of FIG. 2.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder/s 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoders 512/514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not to be limited to the specific embodiment described above.

The bus 516 can load a maximum of 2 instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

Figure 5:
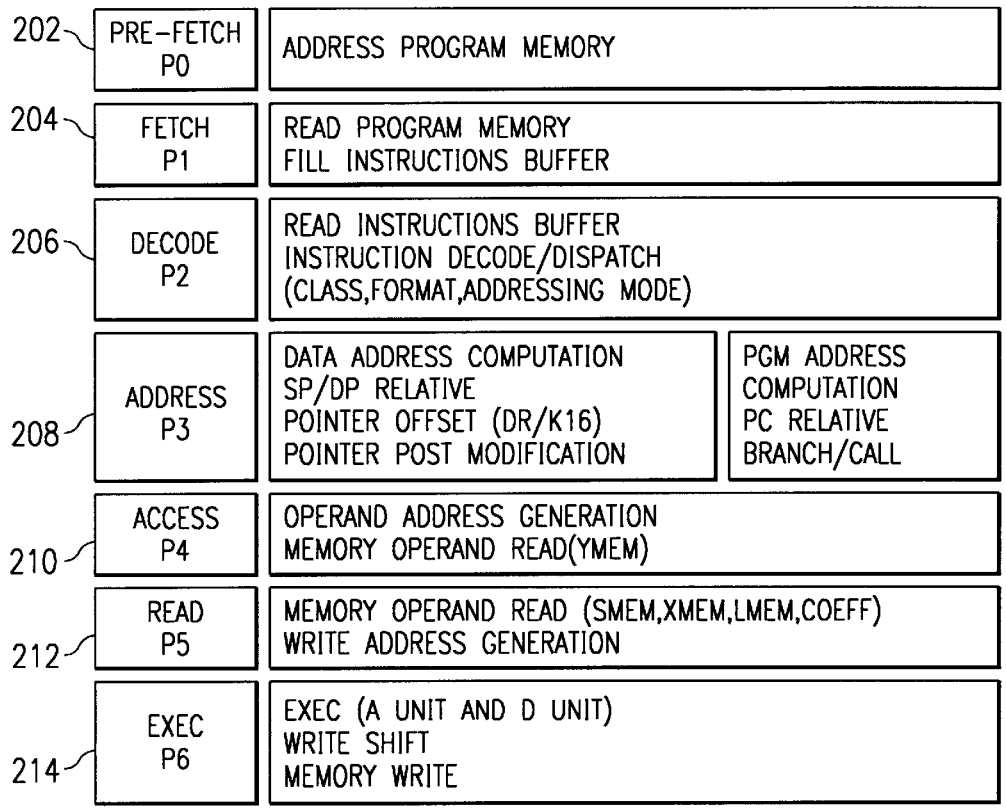
FIG. 5 is a diagrammatic illustration of the pipeline stages for the core processor of FIG. 2.

The processor core 102 executes instructions through a 7 stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 6:
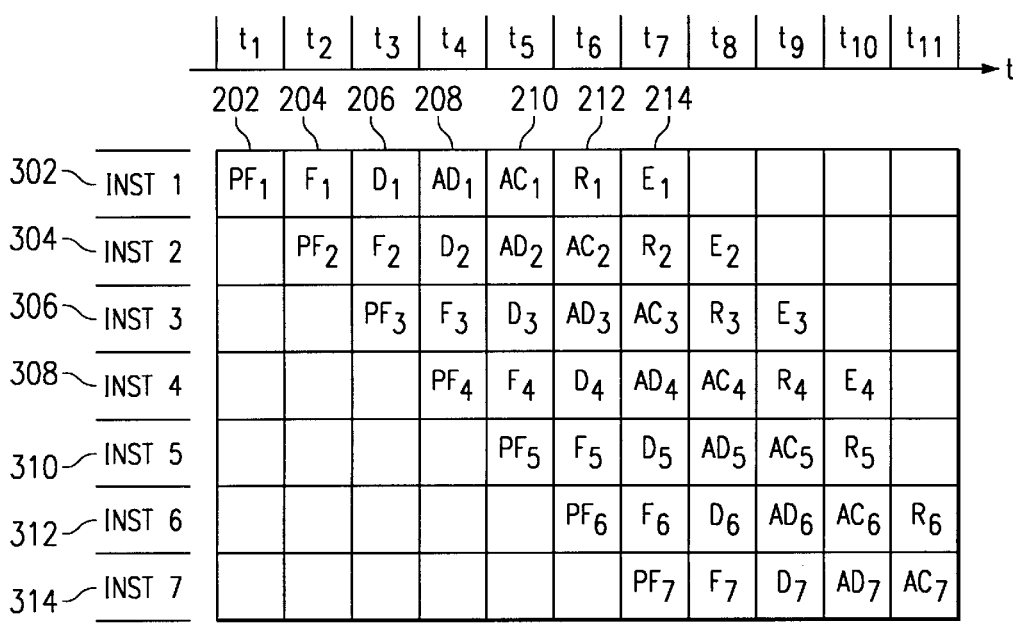
FIG. 6 is a diagrammatic illustration of stages of a thread through the pipeline of the processor of FIG. 1.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of 7 instructions may be processed simultaneously. For all 7 instructions 302–314, FIG. 6 shows them all under process in time period $T_7$. Such a structure adds a form of parallelism to the processing of instructions.

Figure 7:
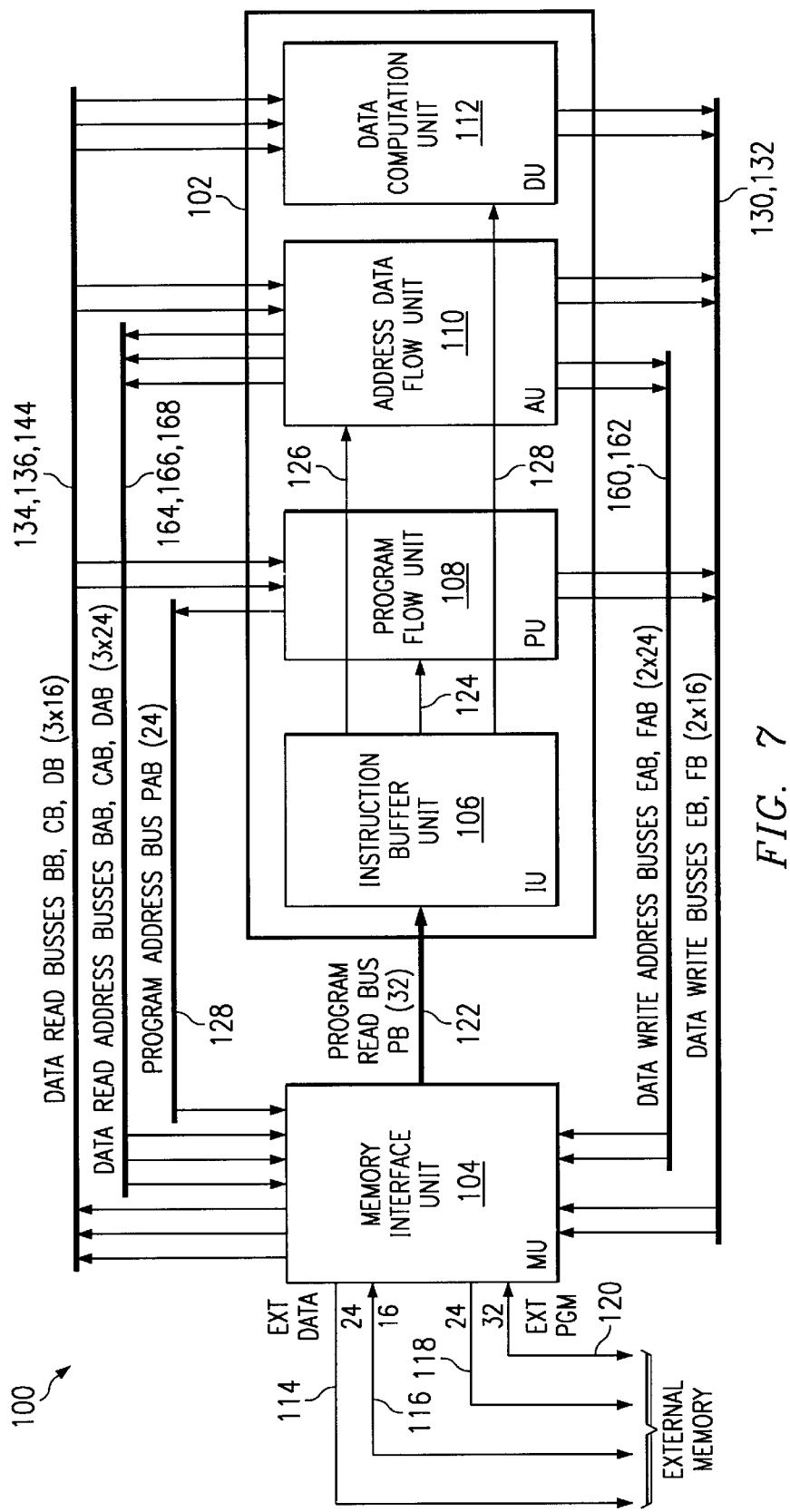
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bidirectional 16 bit data bus 116. Additionally, the memory management unit 104 is coupled to program storage memory (not shown) via a 24 bit address bus 118 and a 32 bit bidirectional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

Figure 8:
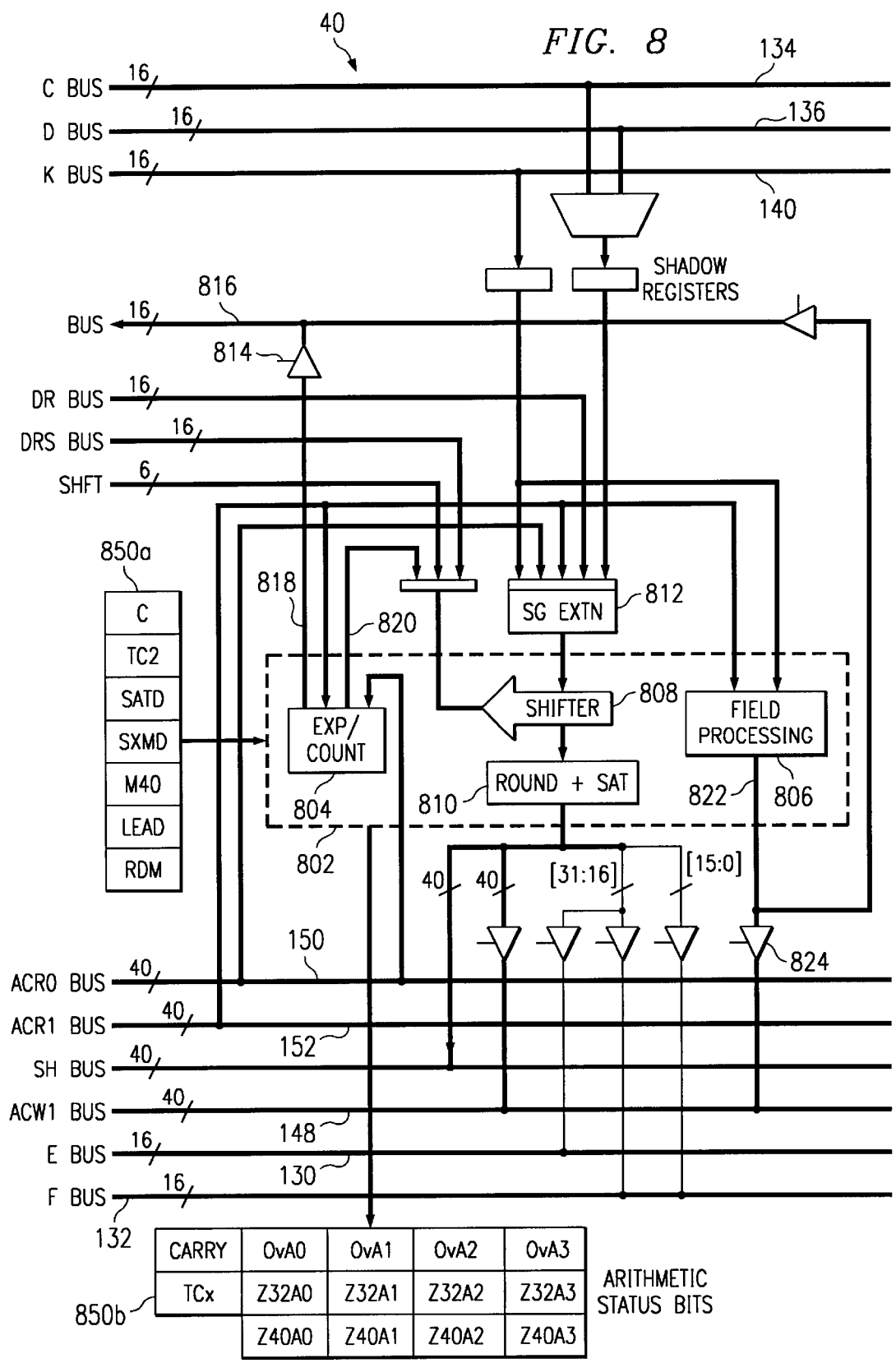
FIG. 8 is a more detailed block diagram of the D Unit shifter illustrated in FIG. 3.

FIG. 8 shows a more detailed block diagram of D Unit shifter 40 described above with reference to FIG. 3. The core of the D Unit shifter 40 is a bit processing unit 802, which comprises various functional units providing means for data processing and operating and/or monitoring bit fields. In a particular embodiment in accordance with the present invention, the bit processing unit 802 includes an Exponent/Count unit 804 for determining exponent values in floating point operations, and counting occurrences of particular data attributes such as the number of "set" or "non-set" bits in a data field. Also included in bit processing unit 802 is a bit field processor 806 for processing data fields to provide bit expand and bit extract operations.

The bit processing unit 802 also comprises a shifter 808, a rounding and saturation unit 810, and a sign extension unit 812.

Since the shifter 808, Rounding and Saturation Unit 810 and sign extension 812 are not relevant to the instant invention, no further reference will be made to them except by way of an aside.

D Unit shifter 40 is coupled to various busses as previously described with reference to FIG. 3. Of these buses, the D Unit 40 bit accumulator read busses ACR0 150 and ACR1 152 are coupled to exponent/count unit 804. In the particular embodiment shown in FIG. 8, exponent/count unit 804 and ACR1 152 are coupled to bit field processor 806 for providing 'source' data words. Optionally, read bus ACR0 150 may be coupled to the bit field processor 806 either alone or with ACR0 152.

An output 818 of exponent count unit 804 is transferred to a data register DRX of the A Unit register file 30 via tri-state buffer 814 and 16 bit bus 816. An output 820 is also coupled to shifter 808 where it may be selected as a control signal for shifter 808.

As described earlier, bit field processor unit 806 has an input coupled to data read bus ACR1 152. Bit field processor 806 has a further input which is coupled to 16 bit constant data bus 140 (K bus), for providing a 'mask' word to the bit field processor 802. An output 822 of bit field processor 802 is transferred via tri-state buffer 824 and 40 bit accumulator write bus ACW1 148 to a register in the D Unit 40 bit register file 36.

Bit processing unit 802 is controlled in part by status and control signals received from a portion of status register 850a. Results of operations performed by bit processing unit 802 are saved in part in a portion of status register 850b. For example, the least significant bit (LSB) of a bit count value produced by a counting instruction is saved in a test/control bit TCx of status register 850b. This allows a program to perform conditional instructions on the parity of the bit count.

Figure 9:
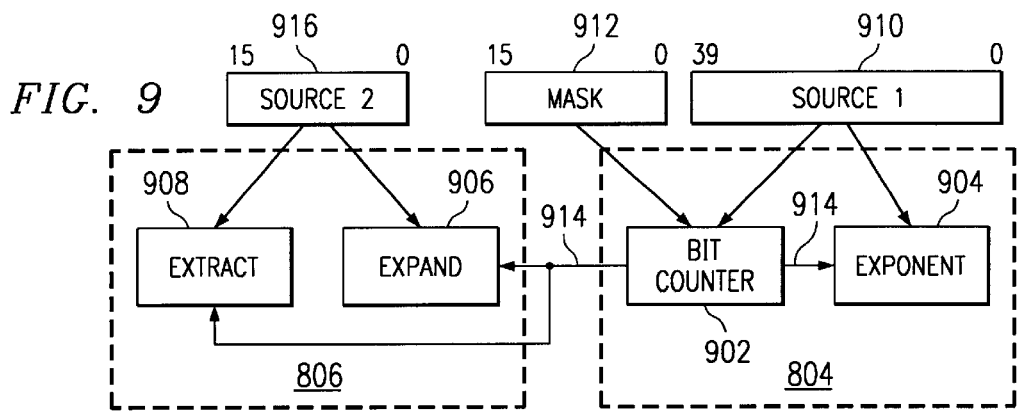
FIG. 9 is a block diagram of bit processing circuitry in accordance with an embodiment of the invention.

In accordance with a particular embodiment of the invention, exponent/count unit 804 and bit field processor 806 share common circuitry having common utility. Thus, the area of silicon taken up by these units can be reduced. A schematic illustration of the particular embodiment utilizing shared circuitry is shown in FIG. 9.

Exponent/count unit 804 comprises a bit counter 902 and exponent circuitry 904. Bit field processor 806 comprises bit expand circuits 906 and bit extract circuitry 908. A 40 bit data word from bus 910 can be a source 1 for both the bit counter 902 and exponent circuitry 904, and a 16 bit mask 912 can also be the input for bit counter 902. Bit field counts 914 can be output from bit counter 902 to exponent 904, and bit expand 906 and extract 908 units for use in those functions. Bit expand 906 and bit extract 908 can have a 16 bit source 2 input from a common data bus 916. Bit counter 902 comprises a number of stages, the first stage of which operates directly on source 1 or the mask, and the later stages act on the result of the previous stage. The results of one or more stages can be output to the exponent 904, and bit expand 906 and extract 908 units.

To provide a better understanding of the present invention, the principle of operation of each of units 902, 904, 906 and 908 will now be described.

Bit counter 902 counts the number of bits in a source data word, such as the 40 bit source 1 data word or 16 bit mask 912, which have a particular data attribute such as being "set" or "not set". The result of the count is returned to the A Unit register file 30 over bus 816, labeled EFC in FIG. 3.

Figure 10A:
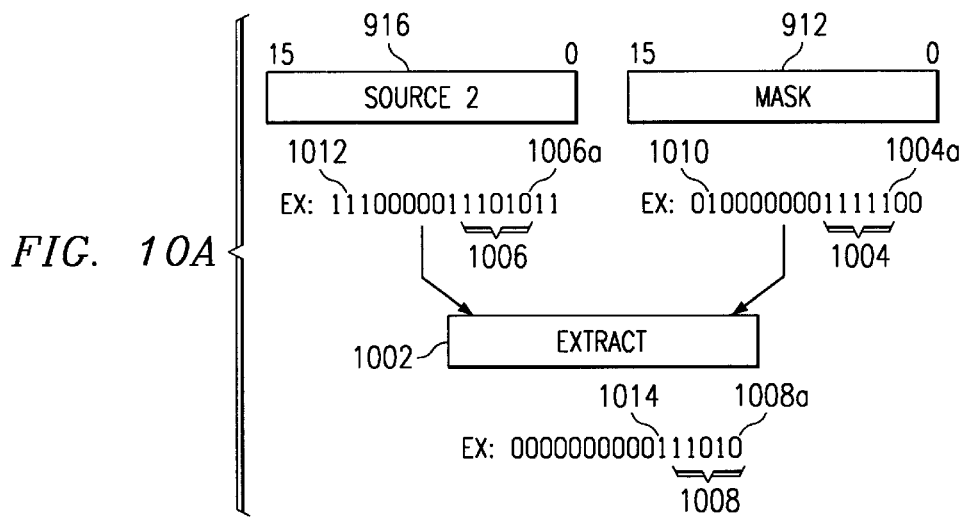
FIG. 10A is a schematic illustration of a Bit_Field extract function.
Figure 10B:
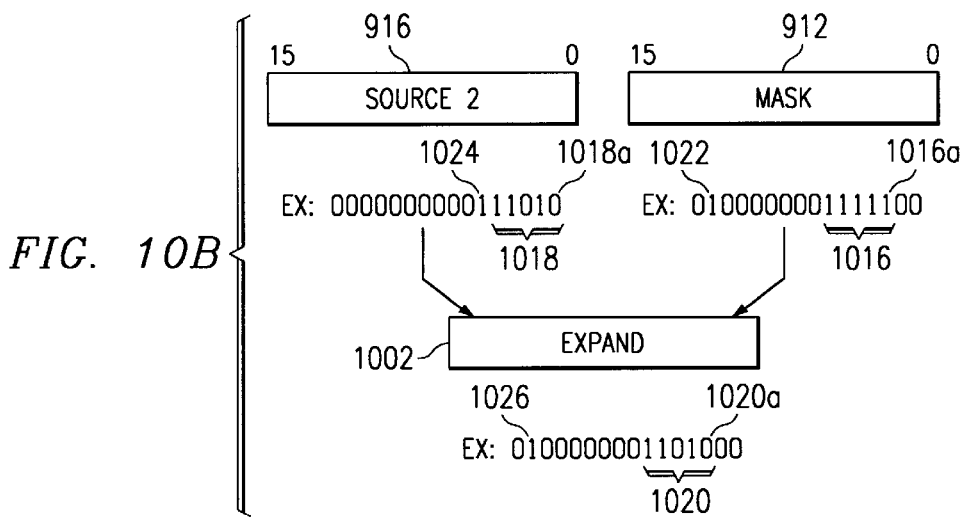
FIG. 10B is a schematic illustration of a Bit_Field expand function.

The bit field extract and expand functions will now be described with reference to FIGS. 10A and 10B. For bit field extract, a bit pattern in mask 912 is used to select or extract bits from source 2 916. In the embodiment illustrated in FIG. 10A, a "set" bit in a bit location in mask 912 causes a correspondingly located bit in source 2 916 to be "packed" in the next available bit location of the destination register 1002. Thus, the first "set" bit 1004a in mask 912 causes "not set" bit 1006a to be placed in the first available bit position 1008a of the destination register 1002. The group of "set" bits 1004 of mask 912 extract the correspondingly located bits 1006 from source 2 916 to bit locations 1008 of the destination register 1002. Additionally, "set" bit 1010 at bit location 14 in mask 912 extracts bit 1012 at location 14 in source 2 916, and "packs" it in the next available bit location, 1014, in the destination register 1002. In this manner, it is possible to extract certain individual or groups of bits from a data word. The extract function is particularly useful for extracting flags from status registers for example. Additionally, the extract function can be used for de-interleaving data frames and error correction decoding, particularly for mobile communications applications.

The expand function can be considered to be the inverse of the extract function, and vice versa, and will now be described with reference to FIG. 10B. In this embodiment, "set" bits in mask 912 "pack" a next available bit, ordered lsb→msb, for a data word source 2 916, in a bit location of the destination register 1002 corresponding to the bit location in the mask 912. Thus, "set" bit 1016a of mask 912, takes the first bit, 1018a, of source 2 916 and places it at location 1020a in destination register 1002. Similarly, group 1016 of mask 912 takes group 1018 from source 2 916, and places them at group 1020 in destination register 1020. "Set" bit 1022 takes the next available bit, 1024, in source 2 916, and places it at a corresponding bit location 1026 in destination register 1002. Thus, bits can be taken from a data word and placed in target bit locations to form a destination word. Such a function has particular use in interleaving data frames in mobile communication systems.

In the foregoing description, the default bit value is zero or "not set". However, it will be evident to a person or ordinary skill in the art that the default value could be one or "set". Additionally, the "active" bit value could be zero, and not one. Embodiments of the invention are also not limited to mask, source and destination registers or words comprising 16 bits, but may comprise other suitable bit lengths.

The exponent unit 904 performs what is known as "exponent computation" and its operation will now be described with reference to FIGS. 11A and 11B. This is an important part of normalizing the mantissa of a floating point number after an operation has been performed on it, during floating point arithmetic for example.

Referring to FIG. 11A, the mantissa of a floating point number is shown labeled 1102. Mantissa 1102 is not normalized, and in a particular embodiment of the invention this is indicated by there being more than one sign bit "S" 1104 in the direction of the most significant bit to the least significant bit of the form S, S, . . . S, not S, X, Y, . . . Z as shown in FIG. 11A, with not sign (not S) 1106 indicating the transition from sign bits to mantissa value. In a particular embodiment, normalization comprises scanning the mantissa to find the bit location of the "S" "not S" sequence 1108, known as exponent computation, and shifting that sequence to the most significant bits of the mantissa value, and updating the exponent value to the corresponding shift value. This results in the format illustrated in FIG. 11B showing the "S", "not S" sequence 1108 in the most significant bits of the normalized mantissa 1110. Although the normalized mantissa is shown with the sign bit at a bit location corresponding to the msb of the data word comprising the mantissa, this need not necessarily be the case. The data word may comprise more bits than required for the mantissa value, and the msb of the mantissa, or sign bit, may be at a position other than the msb of the data word. In a preferred embodiment, the exponent unit 904 performs the exponent computation element of normalization, and delivers the shift value to shifter 808 for shifting the mantissa, and to a 16 bit A Unit data register DRx located in the A Unit register file 30 where it is stored as the exponent value. The corresponding shifted mantissa is stored in a 40 bit D Unit accumulator ACx.

Figure 12A:
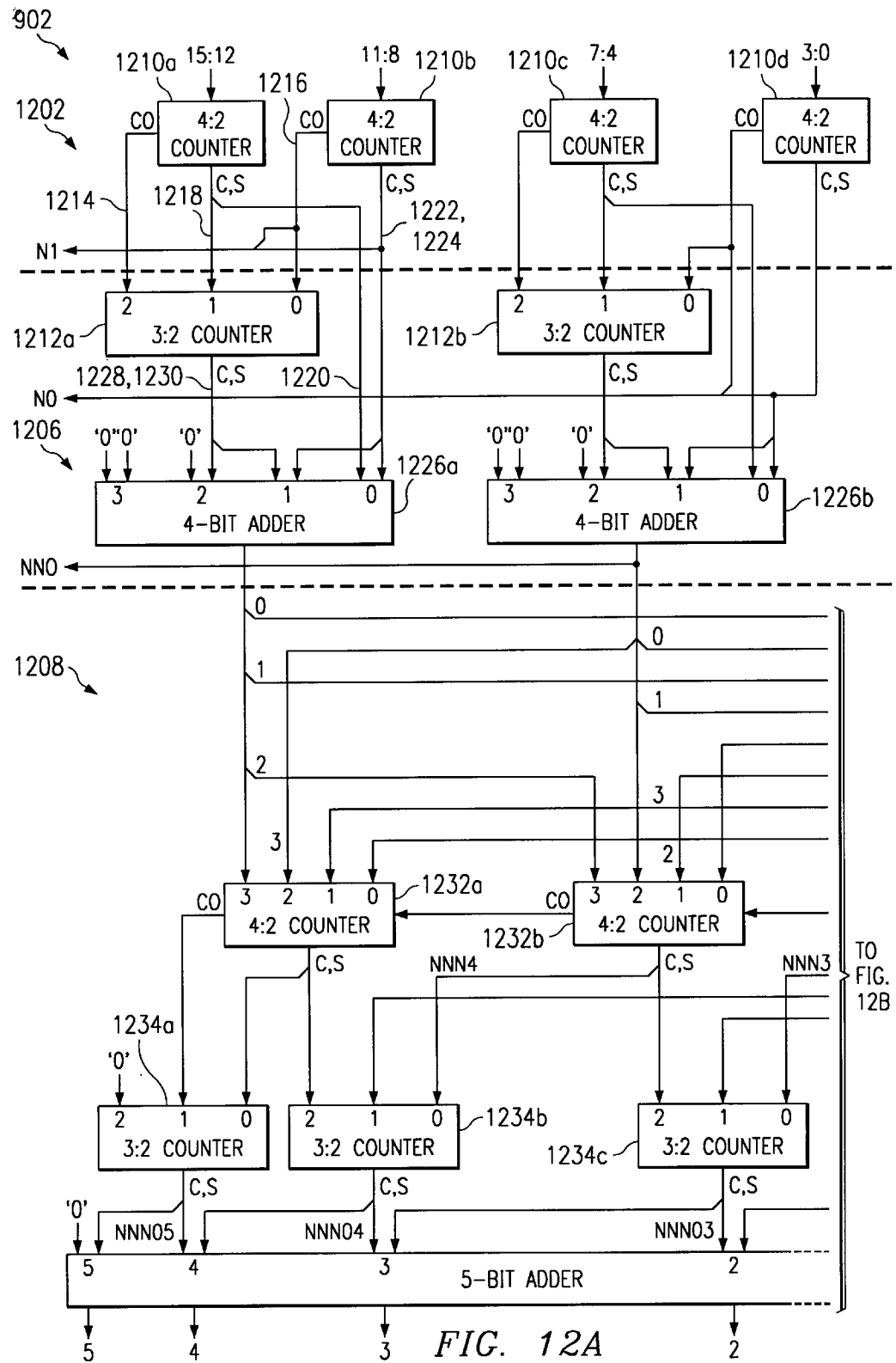
FIGS. 12A, 12B and 12C are a block diagram of common bit processing circuitry and counting circuitry in accordance with an embodiment of the invention.
Figure 12B:
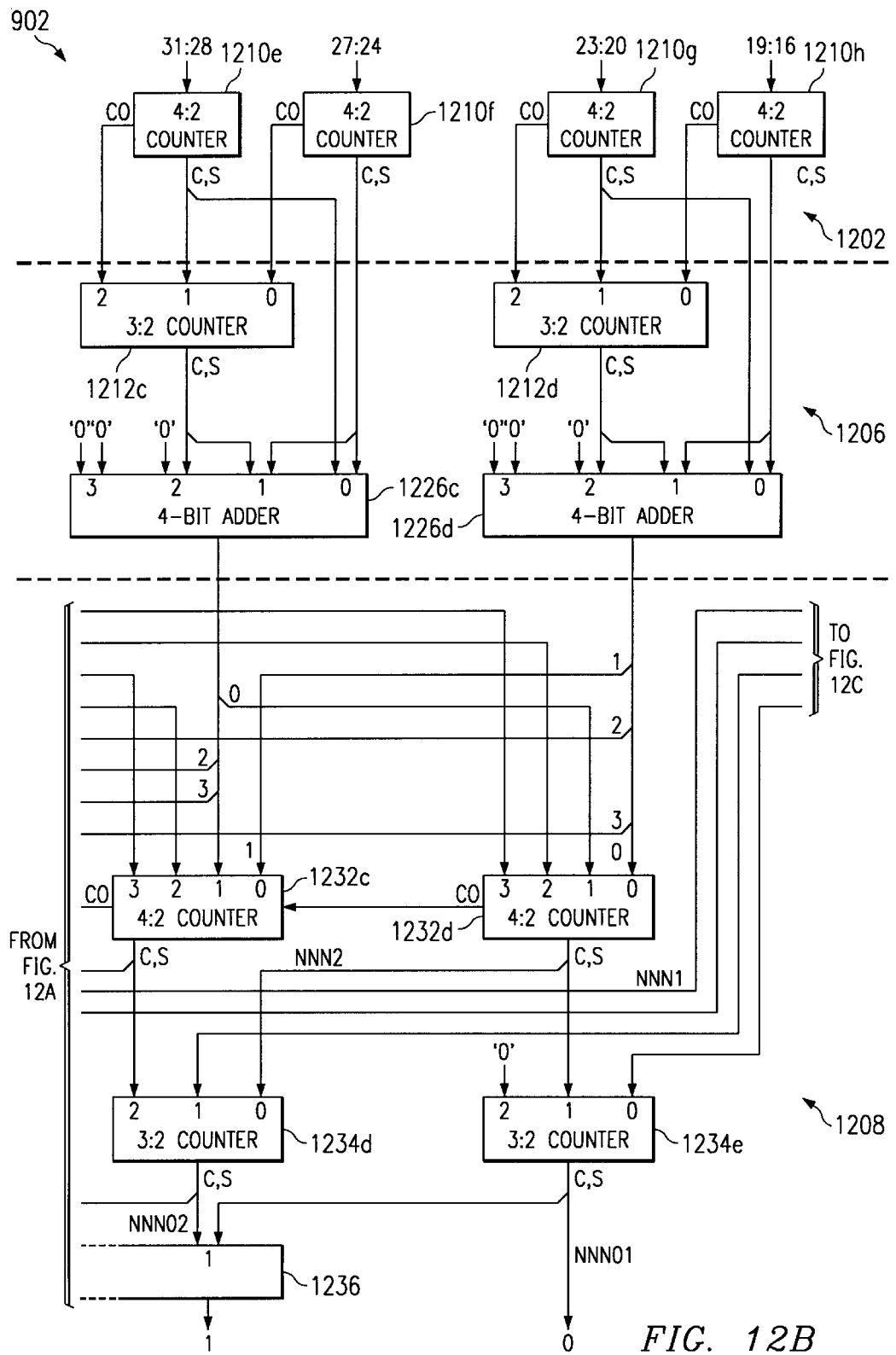
Figure 12C:
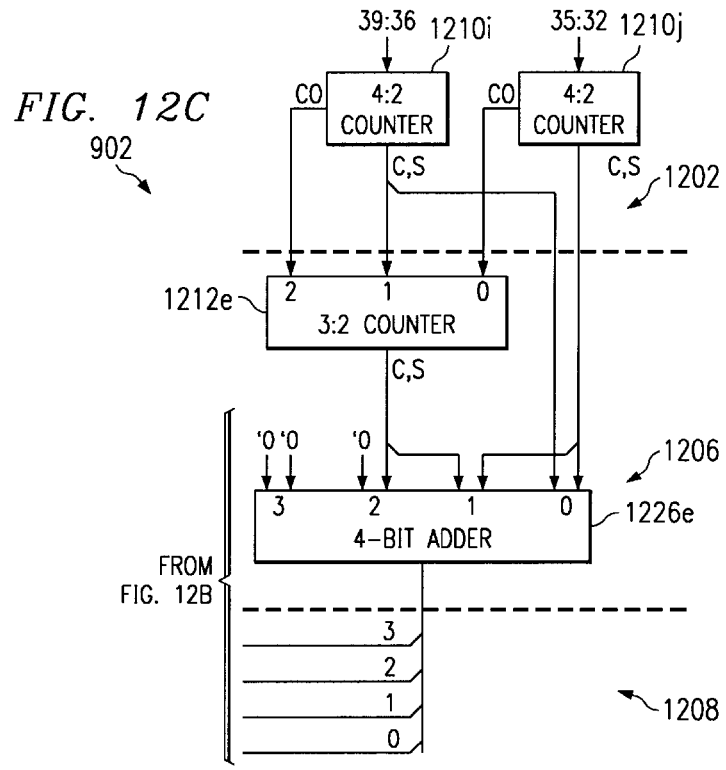

Turning now to FIG. 12, a more detailed description of the common circuitry and counting circuitry, which comprise bit counter 902, in accordance with a preferred embodiment of the invention, will now be provided. For ease of viewing, FIG. 12 is split into three parts, FIGS. 12A, 12B and 12C.

As illustrated in FIG. 12, the circuitry of the preferred embodiment is split into three stages 1202, 1206 and 1208, with stage 1208 being tail circuitry for that part of the bit counter 902 providing a bit counter result.

The source 1 data word, 910, may be a 40 bit or 16 bit word. However, in the example illustrated by FIG. 12, a 40 bit word has been input to bit counter 902. The source data word is input to a set of counters 1210(*a–j*) comprising the first stage 1202 of the common circuitry. Each counter 1210(*a–j*) is a "4 into 2 with carry out" counter, having a 4 bit input with a two bit output and a carry bit. The source data word is split into groups of 4 bits, and each group is input to a respective counter 1210. Counters 1210 are logically grouped in pairs, and adjacent groups of bits are input to adjacent pairs of counters.

The counters and groups of bits are paired as shown in Table 1 below.

TABLE 1

| COUNTERS | BIT GROUPS |
|---|---|
| 1210a, 1210b | 15:12, 15:12, 11:8 |
| 1210c, 1210d | 7:4, 3:0 |
| 1210e, 1210f | 31:28, 27:24 |
| 1210g, 1210h | 23:20, 19:16 |
| 1210i, 1210j | 39:36, 35:32 |

Certain outputs of counters 1210 are input to second stage 1206 of the common circuitry and some form an output N1 for other units of the bit field processor 802. Second stage 1206 comprises 5 counters 1212(*a–e*), each being a "3 into 2" counter. Each counter 1212(*a–e*) receives the same inputs from two associated counters in the first stage 1202, thereby providing an output representative of an eight bit field. The operation of counters 1210*a* and 1210*b* associated with counter 1212*a* will now be described as an example of the operation of the associated set of counters in stage 1202 and stage 1206, namely 1210*c* and 1210*d* associated with 1212*b*, 1210*e* and 1210*f* associated with 1212*c*, 1210*g* and 1210*h* associated with 1212*d* and 1210*i* and 1210*j* associated with 1212*e*.

The carry outs (1214, 1216) of counters 1210*a* and 1210*b* are input to counter 1212*a*, together with the most significant bit (msb) 1218 of counter 1210*a*. Carry out of counter 1210*b* also forms output N1 together with the result (1222, 1224) of counter 1210*b*.

The other counters 1210 of first stage 1202 are coupled to their respective associated counters 1212 in the second stage 1206 in the same manner. Additionally, the output of counter 1210*d* including carry out, forms a second stage output N0.

The result (1228, 1230) of counter 1212*a* is input to a 4 bit Adder 1226*a*, which is part of a set of 4 bit Adders 1226 in the second stage 1206 of the common circuitry. The msb 1228 of the output is input to bit position 2, and the lsb 1230 is input to bit position 1 for adding to the msb 1222 output from counter 1210*b* of the first stage 1202. The lsb 1220 of counter 1210*a* is added to the lsb 1224 of counter 1210*b* in bit position 0 of Adder 1226*a*. Corresponding inputs are made to Adders 1226*b*, 1226*c*, 1226*d* and 1226*e*, from their associated counters 1210 and 1212 in first and second stages 1202, 1206.

The operation of stage 1202 in accordance with the preferred embodiment will now be described with reference to Table 2, which illustrate the operation of one of the counters 1210(*a–j*) which comprises a Sum (S) output and two carry outputs C and C0, such that when the input comprises 1 or three "set" bits the Sum and C0 outputs are "set". Each counter 1210(*a–j*) scans a four bit field and encodes the result as shown in Table 2.

TABLE 2

| Counter input | | | | Counter output | | | Equivalent |
|---|---|---|---|---|---|---|---|
| A3 | A2 | A1 | A0 | S | C | C0 | Bit Count |
| 0 | 0 | 0 | 0 | 0 | 0 | 0 | 0 |
| 0 | 0 | 0 | 1 | 1 | 0 | 0 | 1 |
| 0 | 0 | 1 | 0 | 1 | 0 | 0 | 1 |
| 0 | 0 | 1 | 1 | 0 | 1 | 0 | 2 |
| 0 | 1 | 0 | 0 | 1 | 0 | 0 | 1 |
| 0 | 1 | 0 | 1 | 0 | 1 | 0 | 2 |
| 0 | 1 | 1 | 0 | 0 | 0 | 1 | 2 |
| 0 | 1 | 1 | 1 | 1 | 0 | 1 | 3 |
| 1 | 0 | 0 | 0 | 1 | 0 | 0 | 1 |
| 1 | 0 | 0 | 1 | 0 | 1 | 0 | 2 |
| 1 | 0 | 1 | 0 | 0 | 0 | 1 | 2 |
| 1 | 0 | 1 | 1 | 1 | 0 | 1 | 3 |
| 1 | 1 | 0 | 0 | 0 | 0 | 1 | 2 |
| 1 | 1 | 0 | 1 | 1 | 0 | 1 | 3 |
| 1 | 1 | 1 | 0 | 1 | 0 | 1 | 3 |
| 1 | 1 | 1 | 1 | 0 | 1 | 1 | 4 |

Stage 1202 acts as the first stage of a 'Wallace-like' reduction tree for obtaining the bit count of an eight bit field. The respective outputs N0 and N1 of stage 1202 referred to above are in accordance with Table 2, and represent the number of set bits (1's) in the 4 bit fields 3:0 and 11:8.

Stages 1206 is used for obtaining a bit count on an eight bit field. In this respect, counters 1212(*a–e*) comprise the last stage of the 'Wallace-like' reduction tree used to reduce the eight bit field to the sums performed by adders 1226(*a–e*) of stage 1206 respectively, based on the outputs of counters 1210 taken in pairs with respective eight bit fields.

The four bit outputs from respective Adders 1226 are forwarded to the final bit counter stage 1208, and the output of Adder 1226*b* (NNO) is also provided for use by other units, such as the exponent 904, and expand 906 and extract 908 units. Output NNO of stage 1206 is a 'classically' encoded binary field representing the number of set bits (1's) in the 8 bit field formed of bits 7:0 of the source data word. In the preferred embodiment stage 1208 is a 'Wallace-like' reduction tree for obtaining the final bit count on the full input word from the source, taking the intermediate 8 bit field bit counts from stage 1206 as inputs.

In the preferred embodiment, the counting stage 1208 comprises a group of four "4 into 2 with carry out" counters 1232(*a–d*) for receiving inputs from the four least significant Adders 1212*a*, 1212*b*, 1212*c* and 1212*d* of the second stage 1206. The distribution of the outputs from Adders 1212(a–d) to counters 1232 is laid out in Table 3.

the lsb of the output. The set bit is then input to bit location 2 of counter 1234d where it results in a set lsb in the output.

TABLE 3

| COUNTER | ADDER | | | | | | | | | | | | | | | |
| --- | --- | --- | --- | --- | --- | --- | --- | --- | --- | --- | --- | --- | --- | --- | --- | --- |
| | 1226a Output Bit | | | | 1226b Output Bit | | | | 1226c Output Bit | | | | 1226d Output Bit | | | |
| | 0 | 1 | 2 | 3 | 0 | 1 | 2 | 3 | 0 | 1 | 2 | 3 | 0 | 1 | 2 | 3 |
| 1232a Input Bit | | | 3 | | | | 2 | | | 1 | | | | | | 0 |
| 1232b Input Bit | | 3 | | | | | 2 | | | 1 | | | | | 0 | |
| 1232c Input Bit | 3 | | | | | 2 | | | | 1 | | | | 0 | | |
| 1232d Input Bit | 3 | | | | | | 2 | | | 1 | | | | 0 | | |

In the preferred embodiment, bit counting stage 1208 comprises a further group of counters, in this instance "3 into 2" counters 1234(a–e). Counters 1234 are coupled to counters 1232 and Adder 1226e of the second stage 1206 of the common circuitry in accordance with Table 4 below, where C, S and Co respectively correspond to the Sum, first Carry out and second carry out CO outputs shown in FIG. 12.

This is input to bit location 1 of Adder 123b having all other inputs zero or "not set". Thus, the output of Adder 1236 is 000010, which is 2 decimal.

A person of ordinary skill in the art will readily understand the operation of bit counter 902 for other data words input thereto.

Bit extraction will now be described. The method of performing bit extraction in accordance with a preferred

TABLE 4

| COUNTER 1234 | COUNTERS 1232 Output Bit | | | | | | | | | | | | ADDER 1226e Output Bit | | | |
| --- | --- | --- | --- | --- | --- | --- | --- | --- | --- | --- | --- | --- | --- | --- | --- | --- |
| | a | | | b | | | c | | | d | | | | | | |
| Input Bit | C | S | CO | C | S | CO | C | S | CO | C | S | CO | 0 | 1 | 2 | 3 |
| a | | 0 | 1 | | | | | | | | | | | | | |
| b | 2 | | | | 0 | | | | | | | | | | | 1 |
| c | | | | 2 | | | | 0 | | | | | | | 1 | |
| d | | | | | | | 2 | | | | 0 | | | 1 | | |
| e | | | | | | | | | | 1 | | | 0 | | | |

It should be noted that unused inputs are set to zero, and that the "carry out" CO bits of counters 1232b, 1232c and 1232d are respectively input to the "carry in" of counters 1232a, 1232b and 1232c.

The final stage of the bit counting stage 1208 comprises a 5-bit Adder 1236, which provides the 5 most significant bits of the bit counting result. The lsb of the bit counting result is the lsb output from counter 1234e. The msb of 1234e is added to the lsb of 1234d in bit position 1, the msb of 1234d is added to the lsb of 1234c in bit position 2, the msb of 1234c is added to the lsb of 12334b, in bit position 3, the msb of 1234b is added to the lsb of 1234a in bit position 4, and the msb of 1234a is added to zero in bit position 5.

As an example of the operation of bit counter 902 for a 40 bit data word having a bit set in bit group 15:12 and 11:8, all other bit locations being set to zero, will now be described.

Counters 1210a and 1210b count the number of occurrences of a "set" bit, or "1", in respective bit groups, which for this example yields an output of 1 for 1220 and 1224, and 0 for 1218, 1222, and "carry outs" 1214 and 1216 of respective counters 1210a, 1210b. Set bits 1220 and 1224 are added together in 4-bit Adder 1226a in bit location 0 and result in bit 1 of the output being set. This set bit is input to bits of counters 1232c, all other inputs being zero, and sets embodiment falls into the general category of recursive sorting. Generally, two sequential bit fields (designated with indices i and i+1 where i is an integer including zero), are taken from the source data word. Each field is of a size $2^p$, where p is a positive integer including zero. Turning now to the mask, the number of "set" bits, or "1"s, within bit field i of the mask are determined. This number can have $2^p+1$ values (i.e. the number lies in the range 0 to $2^p$). The bits of the i+1th field of the source are shifted into the ith field of the source, displacing the bits already there depending on the number of set bits found in the ith field of the mask. For example if n (number of bits set "1" in mask field i)=0, all bits of the i+1th field go into the ith field, and the new i+1th bit field is filled with zero.

The process starts with p=0. For p=0 the field size is one bit, and the ith and i+1th sequential bit fields and the ith bit field mask can be represented as source [s(i+1),s(i)] and mask [m(i)] respectively. If m(i)=0 then s(i+1) can be copied into position i resulting in the following bit field [0, i+1]. The resulting bit field has $2^{p+1}$ locations, and the new shifted in bit is forced to zero. If m(i)=1 then the resulting bit field is [i+1,i] and stays unchanged with respect to the source bit field. The foregoing can be done for 8 bit field pairs in parallel, for example on a 16 bit source.

Once the above-described process has been completed for bit field of size $2^p$, then the next stage is to process bit fields of size $2^{p+1}$. Thus, p can be incremented to p=1, and the process restarted. Now the bit fields comprise two bit locations yielding source fields [s(i+1)$_{msb}$,s(i+1)$_{lsb}$], [s(i)$_{msb}$, s(i)$_{lsb}$] and mask field [m(i)$_{msb}$,m(i)$_{lsb}$]. The 2-bit bit fields are of the form of [0,0], [0,1] or [1,1] pairs. Thus, it can be seen that the significant bits for the extraction process are progressing to the right hand side of the bit fields, and the non-useful bits are gradually being eliminated.

Now, for m(i)=00 the resulting bit field is [0,0,s(i+1)], for m(i)=01 the resulting bit field is [0,s(i+1),s(i)$_{msb}$], and for m(i)=11 the resulting bit field is [s(i+1),s(i)].

The possible resulting bit fields for each mask value are shown in Tables 5–7.

TABLE 5 m(i) = 00

| | |
|---|---|
| 00 | 00 |
| 00 | 01 |
| 00 | 11 |

TABLE 6 m(i) = 01

| | |
|---|---|
| 00 | 00 |
| 00 | 01 |
| 00 | 10 |
| 00 | 11 |
| 01 | 10 |
| 01 | 11 |

TABLE 7 m(i) = 11

| | |
|---|---|
| 00 | 00 |
| 00 | 01 |
| 00 | 11 |
| 01 | 00 |
| 01 | 01 |
| 01 | 11 |
| 11 | 00 |
| 11 | 01 |
| 11 | 11 |

The value of p is now incremented (p=2), and the extraction process re-started on the previously processed bit fields, which as can be seen from Tables 5 to 7 are right justified in accordance with the mask m(i). The algorithm described above is applied for p=4 for a 16 bit source word. Source words comprising a greater or lesser number of bits are processed using an appropriate greater or lesser value for p.

In the preferred embodiment described with reference to FIG. 13 hereinafter, an Encoder sorts the bit fields for p up to 2 in a single step.

The above-described algorithm is then utilized for p=2 through to 4. It will be evident to a person of ordinary skill in the art that p may have values greater than 4 if the source and mask comprise more than 16 bits.

A preferred embodiment of the extract unit 908 will now be described with reference to FIG. 13. The right hand side, 1302, of FIG. 13 is a block diagram of the common circuitry of the bit counter 902 utilized by the extract unit 908. The circuitry particular to the extract unit 908 is shown on the left hand side, 1304.

In the preferred embodiment, source 2 916 is split into four groups of four bits, the groups being forwarded to respective encoders 1306, 1308, 1310 and 1312. Similarly, mask 912 is split into groups of four bits which are also input to encoders 1306, 1308, 1310 and 1312. The encoders are associated with bit fields as follows; i with 1312, i+1 with 1310, i+2 with 1308 and i+3 with 1306.

Encoders 1306, 1308, 1310 and 1312 each have four bit outputs of which 1306 and 1308 are input to a first level "8×5 into 1" multiplexor 1314, and 1310 and 1312 are input to another first level "8×5 into 1" multiplexor 1316. Multiplexor 1314 is controlled by output N1 from the first stage 1202 of bit counter 902, and multiplexor 1316 is controlled by output N0 also from the first stage 1202 of bit counter 902. N1 and N0 each comprise 3 bits and respective multiplexors 1314 and 1316 decode N1 and N0 to obtain the count value encoded by the counters 1210b and 1210d to select and direct the multiplexor inputs to one of five bit positions within the multiplexors 1314 and 1316 respectively.

The 8 bit outputs 1318, 1320 of multiplexors 1314, 1316 are input to a second level "16×9 into 1" multiplexor 1322 controllable by the output NN0 of the second stage 1206 of the common circuitry of bit processor 902. The output 1324 of multiplexor 1322 provides the extracted result and is input to destination register 1326.

Figure 14:
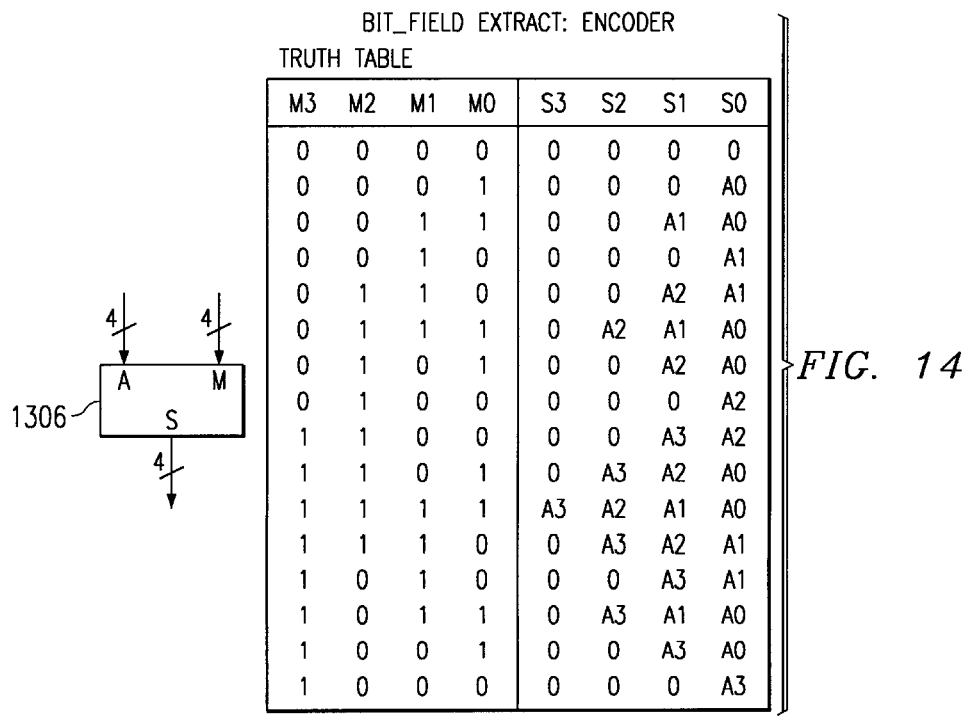
FIG. 14 is a simplified diagram of an encoder of FIG. 13 and a truth table therefor.

A more detailed description of the operation of encoders 1306, 1308, 1310, 1312 in accordance with the preferred embodiment of the invention will now be provided with reference to FIG. 14 which illustrates a truth table for a single encoder 1306 by way of example of the operation of each encoder. It should be noted that in the preferred embodiment, all the encoders operate in the same way. Input A receives bits from the source 2 916, and input M receives bits from the mask 912. S is the encoder output. As can be clearly seen from the truth table of FIG. 14, for a "set" bit in the group of bits (M0–M3) of mask 912, the bit value from the corresponding position in the group of bits (A0–A3) of source 2 916 is communicated to the next available bit position (i.e. not having received a bit value from the A input), of the output (S0–S3).

The operation of encoder 1306 may also be represented by the following equations:

$$S3=A3 \text{ and } M3 \text{ and } M2 \text{ and } M1 \text{ and } M0; \quad (1)$$

$$S2=(A2 \text{ and } M2 \text{ and } M1 \text{ and } M0) \text{ or}$$

$$(A3 \text{ and } ((M3 \text{ and } M2 \text{ and } (M1 \text{ xor } M0)) \text{ or}$$

$$(M3 \text{ and not } M2 \text{ and } M1 \text{ and } M0))); \quad (2)$$

$$S1=(A1 \text{ and } M1 \text{ and } M0) \text{ or}$$

$$(A2 \text{ and } M2 \text{ and } (M1 \text{ xor } M0)) \text{or}$$

$$(A3 \text{ and } ((M3 \text{ and not } M2 \text{ and } (M1 \text{ xor } M0)) \text{or}$$

$$(M3 \text{ and } M2 \text{ and not } M1 \text{ and not } M0))); \quad (3)$$

$$S0=(A3 \text{ and } M3 \text{ and not } M2 \text{ and not } M1 \text{ and not } M0) \text{ or}$$

$$(A2 \text{ and } M2 \text{ and not } M1 \text{ and not } M0) \text{ or}$$

$$(A1 \text{ and } M1 \text{ and not } M0) \text{ or}$$

$$(A0 \text{ and } M0); \quad (4)$$

where the symbol "SX" represents the number of the bit position occupied by a bit value from source 2 916, i.e. S3 indicates that bit 3 of the output is occupied by a bit value from the source 2, while S0 indicates the input which results in the least significant bit of the output being so occupied.

Figure 13:
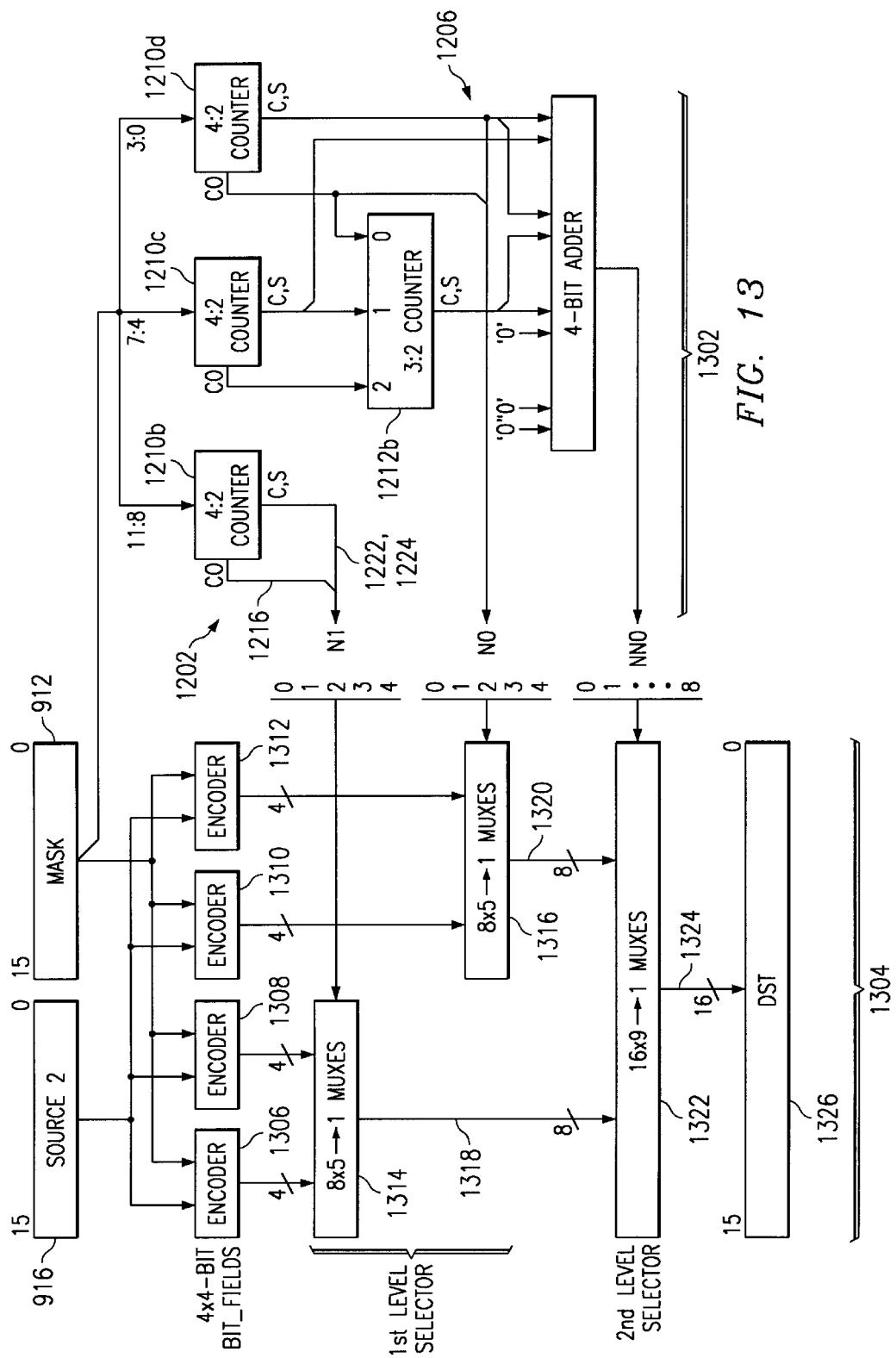
FIG. 13 is a block diagram of common bit processing circuitry and Bit-Field extract circuitry in accordance with an embodiment of the invention.

A more detailed explanation of the operation of the multiplexors 1314, 1316 and 1322 of FIG. 13 will now be provided with reference to FIG. 15. A first level multiplexor, 1316 for example, has 8 bits (A0–A7) input to it from a pair of encoders, 1310, 1312 in this example. Unused inputs are set to zero. Since multiplexor 1316 is a "8×5→1" multiplexor it comprises 8 ports 1502, each having 5 inputs (0–4). The multiplexor ports are controlled by 3 bits N0, output from the first stage 1202 of the common circuitry of bit counter 902. The outputs (A0–A7) of the pair of encoders 1310, 1312 are distributed to the multiplexor ports 1502 as illustrated in FIG. 15. The multiplexor ports in the preferred embodiment are active low select, but may be active high select depending on the logic levels utilized in another implementation.

Depending on N0, particular inputs are communicated to the multiplexor output 1320.

The same scheme is used for elements (A8–A15) of the pair of encoders 1306, 1308 under control of N1 output from the first stage 1202 of bit counter 902. Additionally, a similar scheme is used for multiplexor 1322, but since this is a "16×9→1" multiplexor 4 control bits are necessary to provide nine values for selecting one of nine inputs for each of the 16 ports.

The operation of the "16×9→1" multiplexor 1320 will now be described with the aid of Table 8. The inputs to each port of multiplexor 1320 are labelled E0→E8. The multiplexor 1320 input values are labelled $A_{15} \rightarrow A_0$, and the "Mux." number corresponds to the bit weight of the multiplexor output, reference 1324 of FIG. 13. A "0" relates to an unused input being forced to zero.

TABLE 8

| Mux. | Control signals | | | | | | | | |
|---|---|---|---|---|---|---|---|---|---|
| | E0 | E1 | E2 | E3 | E4 | E5 | E6 | E7 | E8 |
| 0 | A8 | A0 | A0 | A0 | A0 | A0 | A0 | A0 | A0 |
| 1 | A9 | A8 | A1 | A1 | A1 | A1 | A1 | A1 | A1 |
| 2 | A10 | A9 | A8 | A2 | A2 | A2 | A2 | A2 | A2 |
| 3 | A11 | A10 | A9 | A8 | A3 | A3 | A3 | A3 | A3 |
| 4 | A12 | A11 | A10 | A9 | A8 | A4 | A4 | A4 | A4 |
| 5 | A13 | A12 | A11 | A10 | A9 | A8 | A5 | A5 | A5 |
| 6 | A14 | A13 | A12 | A12 | A10 | A9 | A8 | A6 | A6 |
| 7 | A15 | A14 | A13 | A12 | A11 | A10 | A9 | A8 | A7 |
| 8 | "0" | A15 | A14 | A13 | A12 | A11 | A10 | A9 | A8 |
| 9 | "0" | "0" | A15 | A14 | A13 | A12 | A11 | A10 | A9 |
| 10 | "0" | "0" | "0" | A15 | A14 | A13 | A12 | A11 | A10 |
| 11 | "0" | "0" | "0" | "0" | A15 | A14 | A13 | A12 | A11 |
| 12 | "0" | "0" | "0" | "0" | "0" | A15 | A14 | A13 | A12 |
| 13 | "0" | "0" | "0" | "0" | "0" | "0" | A15 | A14 | A13 |
| 14 | "0" | "0" | "0" | "0" | "0" | "0" | "0" | A15 | A14 |
| 15 | "0" | "0" | "0" | "0" | "0" | "0" | "0" | "0" | A15 |

To further aid the understanding of the operation of the preferred embodiment of the bit extract unit 908, and respective inputs and output values or the various elements will be described for a source data word;

1000111010001111, and a mask;

1111100000000001.

For the above-mentioned source and mask data word the outputs from the encoders is as shown in Table 9.

TABLE 9

| | S3 | S2 | S1 | S0 |
|---|---|---|---|---|
| 1306 | 1 | 0 | 0 | 0 |
| 1308 | 0 | 0 | 0 | 1 |
| 1310 | 0 | 0 | 0 | 0 |
| 1312 | 0 | 0 | 0 | 1 |

The outputs from the common circuitry have N1=001 (binary)=1 (decimal), and N0=001 (binary)=1 (decimal).

The input to mux 1316 is 2, 00000001; and to mux 1314 is 10000001. Mux 1316 is controlled by N0=1, and provides the output 1320=00000001, and mux 1314 is controlled by N1=1, and provides the output 1318=001010001. The outputs provide a 16 bit input to mux 1322 of the form, 0011000100000001. Mux 1322 is controlled by NN0= 00000001 (binary)=1 (decimal), providing an output= 0000000000100011.

This output conforms to what is expected from the bit extract function generally described above.

Figure 16:
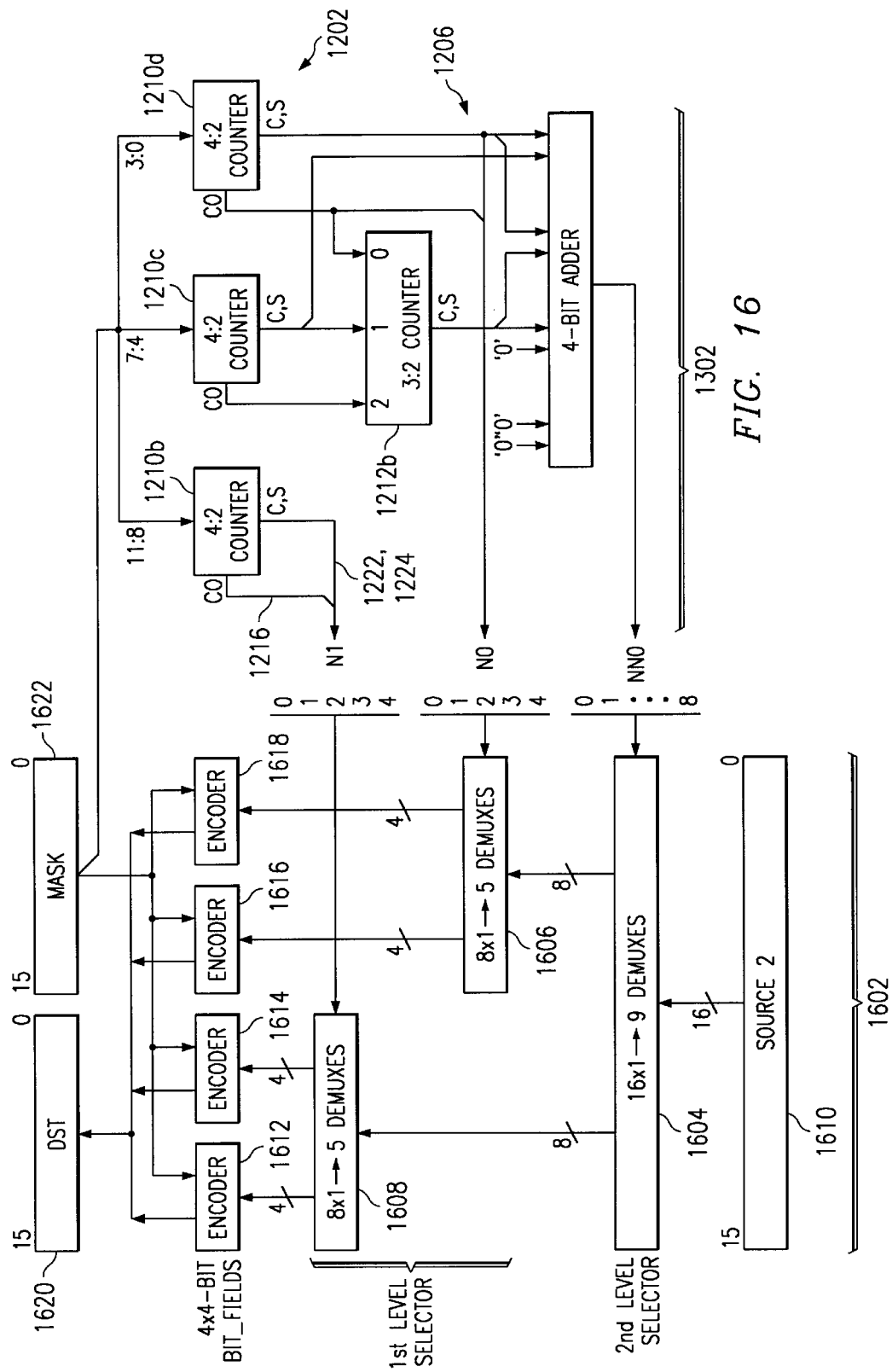
FIG. 16 is a block diagram of common bit processing circuitry and Bit-Field expand circuitry in accordance with an embodiment of the invention.

A more detailed description of the bit field expand circuitry will now be provided, with reference to FIG. 16. As schematically illustrated in FIG. 16, the bit field expand circuitry comprises the common circuitry, 1302, of the bit counter 902. The circuitry particular to the expand unit 906 is shown on the left handside of FIG. 16 labeled 1602. As mentioned previously, the bit field expand function can be considered to be the inverse of the bit field extract function. Thus, the first and second level multiplexors 1314, 1316 and 1322 of bit field extract circuitry 1304, can be replaced by demultiplexors 1608, 1606 and 1604 for the first level and second level respectively. The control signals for respective demultiplexors are N1, N0, and NN0 output from common circuitry 1302, and corresponding to the input control signals for the bit field extract circuitry 1304. Thus, the propagation of bits from a source 1610 through first and second level selectors is reversed with respect to the propagation of bits between the first and second level selectors of the bit field extract circuitry 1304.

The bit field encoders 1612, 1614, 1616 and 1618 operate differently to the encoders 1306, 1308, 1310 and 1312 of the bit field extract circuitry 1304. The operation of encoders 1612, 1614, 1616 and 1618 in accordance with the preferred embodiment of the invention will now be described with reference to FIG. 17, which illustrates a truth table for a single encoder, 1612, by way of example of the operation of each of these encoders. Input A receives bits from one of the demultiplexors 1606 or 1608, and input M receives bits from mask 1622. S is the encoder output. As can be seen from the truth table of FIG. 17, for a first "set" bit in the group of bits (M0–M3) of mask 1622, the first available bit value from the group of bits (A0–A3) from the demultiplexor 1608 is communicated to the corresponding position in the output group of bits (S0–S3), and so forth for further "set" bits and bit values. The output S is input to the destination register 1620 such that the output of encoder 1612 are the most significant bits of the destination of the register, with the output of encoders 1614, 1616 and 1618 providing the next successively significant sets of bits for the destination register 1620. Unused locations are "padded" with zeros.

The operation of encoder 1612 may also be represented by the following equations:

$$S3 = (A0 \text{ and } M3 \text{ and not } M2 \text{ and not } M1 \text{ and not } M0) \text{ or}$$

$$(A1 \text{ and } ((M3 \text{ and } M2 \text{ and not } M1 \text{ and } M0) \text{ or}$$

$$(M3 \text{ and not } M2 \text{ and } (M1 \text{ xor } M0)))) \text{ or}$$

$$(A2 \text{ and } ((M3 \text{ and } M2 \text{ and } (M1 \text{ xor } M0)) \text{ or}$$

$$(M3 \text{ and not } M2 \text{ and } M1 \text{ and } M0))) \text{ or}$$

$$(A3 \text{ and } M3 \text{ and } M2 \text{ and } M1 \text{ and } M0); \tag{5}$$

$$S2 = (A0 \text{ and } M2 \text{ and not } M1 \text{ and not } M0) \text{ or}$$

$$(A1 \text{ and } M2 \text{ and } (M1 \text{ xor } M0)) \text{ or}$$

$$(A2 \text{ and } M2 \text{ and } M1 \text{ and } M0)); \tag{6}$$

$$S1 = (A0 \text{ and } M1 \text{ and not } M0) \text{ or}$$

$$(A1 \text{ and } M2 \text{ and } M1 \text{ and } M0); \tag{7}$$

$$S0 = A0 \text{ and } M0; \tag{8}$$

Where the symbol SX "represents the bit position in the encoder output occupied by the bit value from the corresponding position in the encoder input (A).

The progress of bits from source 2, 1610, through the second and first level multiplexors, 1604, 1606 and 1608 can be followed by reference to the multiplexors illustrated in FIG. 15, and reversing the data flow. The operation of the second and first level multiplexors will be readily apparent to a person of ordinary skill having regard to the reciprocity between the multiplexors of the bit field extract circuitry 1304 and the bit field expand circuitry 1602.

Figure 18A:
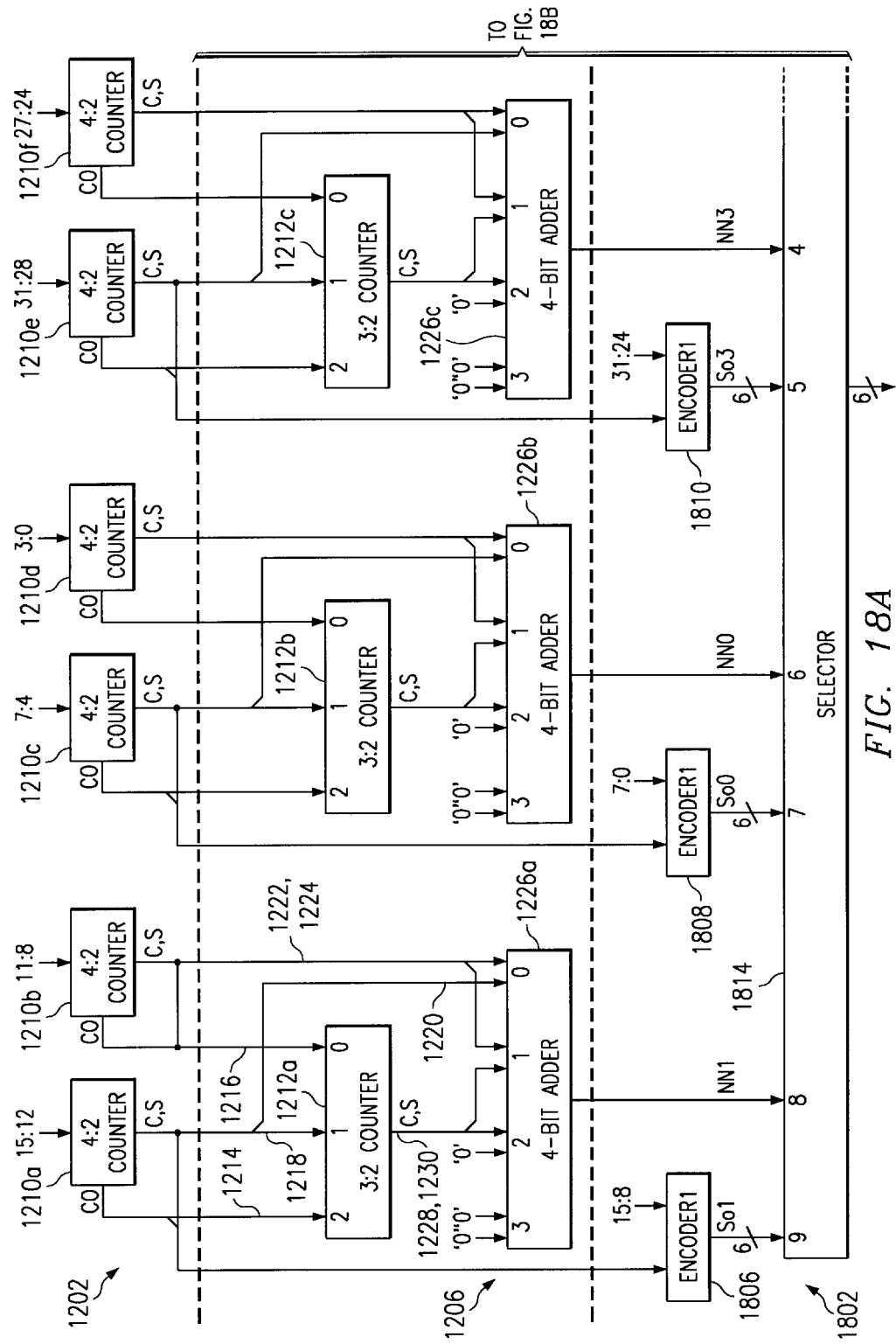
FIG. 18 is a block diagram of common bit processing circuitry and exponent counting circuitry in accordance with an embodiment of the invention.
Figure 18B:
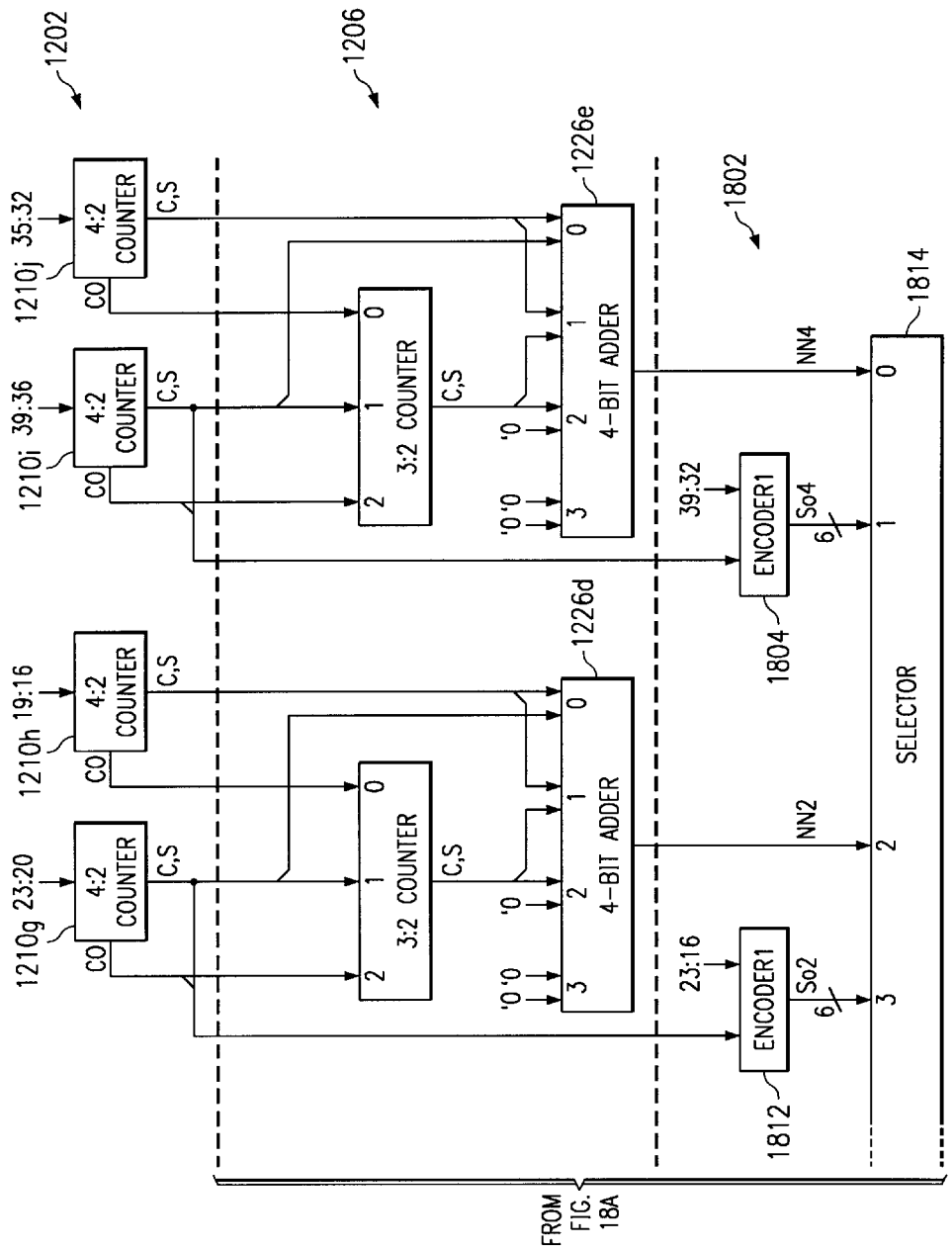

A detailed explanation of the exponent counting circuitry 904 will now be provided with reference to FIG. 18. In the preferred embodiment of the invention, the exponent counting circuitry 904 comprises the two stages 1202 and 1206 of the common circuitry of bit counter 902, and a tail part 1802 performing the final part of the exponent computation. For ease of reference FIG. 18 has been split over two pages.

The output of stage 1206 to tail part 1802 corresponds to the sequence of "set" bits starting from the msb of the data word in source 1910. The output of stage 1206 provides select signals for the encoders of tail part 1802, and selector 1814. The data word is sliced into eight bit groups and encoded and selected such that, starting from the msb, for each group having all bits "set" an eight bit offset is encoded represented by output SoX and NNX. For an eight bit group not having all bits "set" then the position of the bit transition relative to the msb of the group is encoded and represented by SoX and NNX for the group in which the transition occurred. Selector 1814 is operated in accordance with an algorithm and SoX, NNX inputs to output a result corresponding to the bit shift necessary to normalize the mantissa. The algorithm can be configured to provide a bit shift for any specified normalized sign position.

A more detailed description of the exponent counting circuitry now follows. The tail part of the exponent computation 1802, comprises an encoder level having an encoder 1804, and four other encoders 1806, 1808, 1810 and 1812 having similar operations to each other. Encoder 1804 receives the output of "4 into 2" counter 1210*i* and the eight most significant bits of the source data word. Encoder 1804 outputs a 6 bit result to bit position 1 of selector 1814. Encoders 1806, 1808, 1810 and 1812 respectively receive the outputs of "4 into 2" counters 1210*a*, 1210*c*, 1210*e* and 1210*g*. Additionally, 1806 receives bits 15:8, 1808 bits 7:0, 1810 bits 31:24 and 1812 bits 23:16 of the source data word. Encoders 1806, 1808, 1810 and 1812 each output a 6 bit result respectively to bit position 9, 7, 5 and 3 of selector 1814.

The operation of encoder 1804 will now be described with reference to FIG. 19, showing a truth table for the lower half of the encoder by way of example, and the following equations. Input A of encoder 1804 receives 8 bits from the source 1 910 and input N receives 3 bits from the output of counter 1210*i*. So is the encoder output.

$$S2 = \text{not } A2 \text{ or not } A1 \text{ or not } A0; \tag{9}$$

$$S1 = A2 \text{ and } A1 \text{ and not } A0; \tag{10}$$

$$S0 = (A2 \text{ and not } A1) \text{ or } (\text{not } A3 \text{ and not } A0) \tag{11}$$

if (N1 and N2 and not N0){
So5=1
So4=1
So3=1
So2=S2 (A3, A2, A1, A0)
So1=S1 (A3, A2, A1, A0)
So0=S0 (A3, A2, A1, A0)
}else{
So5=1
So4=1
So3=0
So2=S2 (A7, A6, A5, A4)
So1=S1 (A7, A6, A5, A4)
So0=S0 (A7, A6, A5, A4)
};

where the symbol "SoX" represents the bit position in the output of the encoder 1804.

A detailed explanation of the operation of encoders 1806, 1808, 1810 and 1812 will now be provided with reference to encoder 1806 by way of example, as illustrated in FIG. 20. Input A receives 8 bits, 15:8, from source to 910, and input N receives 3 bits from the output of "4 into 2" counter 1210*a*. So is the 6 bit encoder output. The encoder operates in accordance with the truth table, the lower half of which is illustrated in FIG. 18 by way of example, and the following equations:

$$S1 = (A2 \text{ and not } A1) \text{ or } (A2 \text{ and } A0); \tag{12}$$

$$S0 = A2 \text{ and } A1; \tag{13}$$

if (N1 and N2 and not N0){
(14)
So5=0
So4=0
S03=0
S02=1
So1=S1 (A3, A2, A1, A0)
So0=S0 (A3, A2, A1, A0)
}else{
So5=0
So4=0
So3=0
So2=0
So1=S1 (A7, A6, A5, A4)
So0=S0 (A7, A6, A5, A4)
};

where the symbol "SX" identifies the bit position in the encoder output.

Selector 1814 also receives inputs from 4 bit adders 1226a, 1226b, 1226c, 1226d and 1226e to input 8,6,4,2 and 0, labelled NN0, NN1, NN2, NN3 and NN4 respectively in FIG. 21 and corresponding to the same references in FIG. 18. The function of the bit exponent selector 1814 maybe represented by logical equation 15 below:

if (NN4!=8){                          (15)

S=So4  
} else if ((NN4==8) && (NN3!=8){  
S=So3  
} else if ((NN4==8) && (NN3==8) && (NN2!=8){  
S=So3+8  
} else if ((NN4==8) && (NN3==8) && (NN2==8) && (NN1!=8){  
S=So3+16  
}else{  
S=So3+24  
}

The 6 bit output S provides the exponent value for the data word in source 1, FIG. 10.

To further describe and aid the understanding of exponent computation in accordance with the preferred embodiment of the invention, an example of exponent computation will now be provided. In the present example the source is source 1, illustrated in FIG. 9, and is a 40 bit data word having its sign position at bit position 31, as indicated in Table 10. The sign positions are labelled with positive or negative senses relative to the sign bit position, bit position 31.

TABLE 10

| | | | | | | | | Bit Position | | | | | | | | | | | |
|---|---|---|---|---|---|---|---|---|---|---|---|---|---|---|---|---|---|---|---|
| No. | 39 | 38 | 37 | 36 | 35 | 34 | 33 | 32 | 31 | 30 | 29 | 28 | 27 | 26 | 25 | 24 | ... | 0 |
| Source 1 | 1 | 1 | 1 | 1 | 1 | 1 | 1 | 1 | 1 | 1 | 1 | 1 | 1 | 0 | 0 | 0 | ... | 0 |
| Sign position | -8 | -7 | -6 | -5 | -4 | -3 | -2 | -1 | 0 | 1 | 2 | 3 | 4 | 5 | 6 | 7 | ... | 31 |

In the example illustrated in Table 10 above the single thick line indicates the boundary of the normalized mantissa, and the location of its sign bit position. As an example, the solid box indicates the position of the sign bit for an un-normalized mantissa in bit 27. In this example the sign bit would have to be shifted 4 bit positions to the left (in the direction of the msb) in order to normalize the mantissa. If the sign bit were in a bit position 35 as shown by the broken box, then it would have to be shifted 4 bit positions in the lsb direction.

Referring now to FIG. 18 and FIG. 21 (re. selector 1814 of FIG. 18), the 4→2 counters, adders, encoders and selector have outputs as shown in Table 11 for the data word in source 1 shown above in Table 10.

TABLE 11

| Counter | 1210i | 1210e | 1210g | 1210a | 1210c |
|---|---|---|---|---|---|
| Bits | 39:36 | 31:28 | 23:20 | 15:12 | 7:4 |
| Bit Output* | 110 (4) | 110 (4) | 110 (4) | 110 (4) | 110 (4) |
| Adder | 1226e | 1226c | 1226d | 1226a | 1226b |
| Bits | 39:32 | 31:24 | 23:16 | 15:8 | 7:0 |
| Bit Output | 1000 | 0101 | 1000 | 1000 | 1000 |
| | (NN4 = 8) | (NN3 = 5) | (NN2 = 8) | (NN1 = 8) | (NN0 = 8) |
| Encoder | 1804 | 1810 | 1812 | 1806 | 1808 |
| | (So4) | (So3) | (So2) | (So1) | (So0) |
| Bits | 39:32 | 31:24 | 23:16 | 15:8 | 7:0 |

TABLE 11-continued

| Bit Output | 111000 | 000100 | 000111 | 000111 | 000111 |
|---|---|---|---|---|---|
| Selector Output | Since NN4 = 8 & NN3! = 8 it follows from the algorithm described above that S = So3 = 000100 = 4 | | | | |

*from Table 2, when all the inputs are at 1 or "set" the 4→2 counter provides Co, C, S = (1,1,0).

In view of the foregoing description it will be evident to a person skilled in the art that various modifications may be made within the scope of the invention. For example, extract and expand functions may be implemented by having multiplexor trees for each bit position to be extracted. However, this would require more hardware and be slower than the specific embodiments described hereinabove.

One application for a processing engine such as the processor 10, for example as incorporated in an integrated circuit, is in a telecommunications device, for example a mobile wireless telecommunications device. FIG. 22 illustrates one example of such a telecommunications device. In the specific example illustrated in FIG. 22, the telecommunications device is a mobile telephone 11 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

The scope of the present disclosure includes any novel feature or combination of features disclosed therein either explicitly or implicitly or any generalisation thereof irrespective of whether or not it relates to the claimed invention or mitigates any or all of the problems addressed by the present invention.

As used herein, the terms "applied", "connected", and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system with a processor, wherein the processor comprises:

first circuitry adapted to derive an intermediate signal from a signal input thereto, and further circuitry for receiving said intermediate signal and operating thereon, and on a signal associated with said input signal in accordance with said intermediate signal, for providing a final signal derived from said input signal and said associated signal, said further circuitry comprising circuitry operable with said first circuitry for forming composite bit extract circuitry and for utilizing said intermediate signal to provide a bit sequence extracted from said associated signal in accordance with said input signal and means for slicing said associated signal and input signal into corresponding groups and shifting a bit positioned in an associated signal group to a position determined by a corresponding input signal group.

2. The digital system according claim 1, said further circuitry comprising means for receiving a signal corresponding to a signal from said slicing means comprising said shifted bit, and operating on said signal in accordance with control signals derived from said intermediate signal.

3. The digital system according claim 2, said means for receiving adapted to operate on said signal in larger groups, and to shift a bit positioned in said signal to a position determined by said control signals.

4. A digital system with a processor, wherein the processor comprises:

first circuitry adapted to derive an intermediate signal from a signal input thereto, and further circuitry for receiving said intermediate signal and operating thereon, and on a signal associated with said input signal in accordance with said intermediate signal, for providing a final signal derived from said input signal and said associated signal, wherein said further circuitry comprises circuitry operable with said first circuitry for forming composite bit expand circuitry and for utilizing said intermediate signal to provide a bit sequence expanded from said associated signal in accordance with said input signal.

5. The digital system according claim 4, said further circuitry comprising means for distributing bits from said associated signal to bit locations in at least two bit groups determined by control signals derived from said intermediate signal.

6. The digital system according claim 5, said further circuitry comprising means for distributing bits of said distributed bits to bit locations in smaller bit groups determined by further control signals derived from said intermediate signal.

7. A digital system with a processor, wherein the processor comprises:

first circuitry adapted to derive an intermediate signal from a signal input thereto, and further circuitry for receiving said intermediate signal and operating thereon, and on a signal associated with said input signal in accordance with said intermediate signal, for providing a final signal derived from said input signal and said associated signal, wherein said further circuitry comprises tail part circuitry operable with said first circuitry for forming composite exponent counting circuitry and for utilizing said intermediate signal to provide a shift value for normalizing said input signal, said further circuitry comprising:

circuitry operable with said first circuitry for forming composite bit extract circuitry and for utilizing said intermediate signal to provide a bit sequence extracted from said associated signal in accordance with said input signal;

circuitry operable with said first circuitry for forming composite bit expand circuitry and for utilizing said intermediate signal to provide a bit sequence expanded from said associated signal in accordance with said input signal; and tail part circuitry operable with said first circuitry for forming composite exponent counting circuitry and for utilizing said intermediate signal to provide a shift value for normalizing said input signal.

8. The digital system according claim 7, said tail part circuitry comprising respective processing means for receiving respective segments of said input signal and controllable by signals derivable from respective parts of said intermediate signal to provide said shift value.

* * * * *